(12) United States Patent
Takada et al.

(10) Patent No.: US 8,524,810 B2
(45) Date of Patent: Sep. 3, 2013

(54) CELLULOSE ACYLATE FILM, METHOD FOR PRODUCING SAME, POLARIZER AND LIQUID CRYSTAL DISPLAY DEVICE

(75) Inventors: Ryousuke Takada, Minami-ashigara (JP); Yoshiaki Hisakado, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 245 days.

(21) Appl. No.: 12/848,331

(22) Filed: Aug. 2, 2010

(65) Prior Publication Data

US 2011/0039986 A1 Feb. 17, 2011

(30) Foreign Application Priority Data

Aug. 11, 2009 (JP) ................................. 2009-186802

(51) Int. Cl.
*C08L 1/10* (2006.01)
*C08L 1/00* (2006.01)
*B28B 1/14* (2006.01)

(52) U.S. Cl.
USPC ................................ 524/37; 524/35; 264/299

(58) Field of Classification Search
USPC .......................................... 524/37; 264/299
See application file for complete search history.

(56) References Cited

U.S. PATENT DOCUMENTS

| | | | | |
|---|---|---|---|---|
| 3,392,155 | A | * | 7/1968 | Muskat ........................ 525/327.7 |
| 5,446,079 | A | | 8/1995 | Buchanan et al. |
| 2002/0192397 | A1 | * | 12/2002 | Tsujimoto .................... 428/1.31 |
| 2007/0292802 | A1 | * | 12/2007 | Sato ............................ 430/270.1 |

FOREIGN PATENT DOCUMENTS

| | | |
|---|---|---|
| EP | 0 911 656 A2 | 4/1999 |
| JP | 2587398 B2 | 5/1997 |
| JP | 2001-337222 A | 12/2001 |
| JP | 2001-354802 A | 12/2001 |
| JP | 2002-022956 A | 1/2002 |
| JP | 2007-304376 A | 11/2007 |

OTHER PUBLICATIONS

"Improving the properties of Waterborne coatings with High-Performance SMA", Paint & Coating Industry, p. 46-48 and 50, Apr. 1, 2005.*
Machine trnaslation of JP2007-304376, part 1, Nov. 2007.*
Machine trnaslation of JP2007-304376, part 2, Nov. 2007.*

* cited by examiner

Primary Examiner — Ling-Siu Choi
Assistant Examiner — Aiqun Li
(74) Attorney, Agent, or Firm — Buchanan Ingersoll & Rooney PC

(57) ABSTRACT

A cellulose acylate film is produced by casting a solution comprising a cellulose acylate resin and a partially ring-opened, styrene/maleic anhydride copolymer. The produced film has improved wet heat durability and low haze.

9 Claims, No Drawings

CELLULOSE ACYLATE FILM, METHOD FOR PRODUCING SAME, POLARIZER AND LIQUID CRYSTAL DISPLAY DEVICE

CROSS-REFERENCE TO RELATED APPLICATIONS

The present application claims the benefit of priority from Japanese Patent Application No. 2009-186802, filed on Aug. 11, 2009, the contents of which are herein incorporated by reference in their entirety.

BACKGROUND OF THE INVENTION

1. Field of the Invention

The present invention relates to a cellulose acylate film, which is excellent in the wet heat durability of the retardation in the in-plane direction and in the thickness direction thereof and of which the haze level is sufficiently low, and to a method for producing it. Precisely, the invention relates to a cellulose acylate film which has been improved in point of the wet heat durability of the optical properties thereof by adding an additive having a specific structure thereto, and which is useful in liquid crystal display devices and which hardly whitens (the haze is low), to a method for producing it, and to a polarizer and a liquid crystal device produced by the use of the cellulose acylate film.

2. Description of the Related Art

In general, a liquid crystal display device comprises a liquid crystal cell, an optically-compensatory film, and a polarizing element. The optically-compensatory film serves to cancel image coloration and to enlarge a viewing angle, including a stretched birefringent film and a film produced by coating a transparent film with a liquid crystal. For example, Japanese Patent No. 2587398 discloses a technique of applying an optically-compensatory film prepared by applying a discotic liquid crystal to a triacetyl cellulose film and aligning and fixing it thereon, to a TN-mode liquid crystal cell to thereby enlarge a viewing angle.

However, for a liquid crystal display device for TVs that are expected to be watched at various angles on a large-size panel, the requirement in point of the viewing angle dependence thereof is severe, and still could not be on a satisfactory level even though the above-mentioned technique is applied thereto. Accordingly, others than TN-mode liquid crystal display devices, such as IPS (in-plane switching) mode, OCB (optically compensatory bend) mode and VA (vertically aligned) mode devices are now under investigations. In particular, VA-mode devices have a high contrast and the production yield thereof is relatively high, and therefore they are now being in the mainstream of liquid crystal display devices for TV.

As the material of the polarizing element that is indispensable in a liquid crystal display device, in general, polyvinyl alcohol (hereinafter this may be referred to as "PVA") is mainly used. A PVA film is monoaxially stretched and then colored with iodine or a dichroic dye, or after colored, it is stretched, and thereafter the resulting film is crosslinked with a boron compound to have a polarizing ability, and is used as a polarizing element.

For use that requires optical isotropy as in protective films for polarizers, cellulose acylate films are generally used. This is based on the characteristics thereof in that cellulose acylate films have a higher optical isotropy (having a lower retardation) as compared with other polymer films.

On the other hand, an optically-compensatory film (retardation film) in liquid crystal display devices is required to have an optical anisotropy (a high retardation) contrary to the above. Especially an optically-compensatory film for use in VA mode devices is required to have an Re (Re indicates the in-plane retardation of the film.) from 30 to 100 nm and an Rth (Rth indicates retardation in the thickness direction of the film.) from 80 to 300 nm. Accordingly, as the optically-compensatory film, heretofore generally used are synthetic polymer films having a high retardation, such as polycarbonate films and polysulfone films.

Specifically, the general principle of optical members for use in liquid crystal display devices is that synthetic polymer films are used in case where the polymer films are required to have an optical anisotropy (a high retardation), but cellulose acylate films are used in case where the films are required to have an optical isotropy (a low retardation).

In EP-A 911656, proposed is a cellulose acetate film having a high retardation which is applicable also to use that requires an optical anisotropy, contrary to the conventional general principle. In this proposal, an aromatic compound having at least two aromatic rings, especially a compound having 1,3,5-triazine rings is added to a cellulose triacetate film and the film is stretched to thereby realize a high retardation of the film. In general, cellulose triacetate is a hardly-stretchable polymer material, and it is known that the birefringence of the film is difficult to increase; however, the additive in the film is also oriented therein through the stretching treatment of the film, whereby the birefringence of the stretched film can be increased and a high retardation of the resulting film is thereby realized. The film can serve also as a protective film of a polarizer, and therefore has an advantage in that the necessary member films constituting a liquid crystal display device can be reduced, and inexpensive and thin-body liquid crystal display devices can be provided.

The methods disclosed in EP-A 911656 and JP 2587398 is useful in that thin liquid crystal display devices are manufactured economically.

Recently, use of liquid crystal display devices is increasing more and more, and the devices for outdoor use and those for in-car use are much increasing. Accordingly, liquid crystal display devices favorable for use in wet heat environments are being required.

For example, as a method for improving the moisture permeability of a cellulose acylate film in use in wet heat environments, a method of increasing the amount of the additive to the film is proposed (See JP-A 2002-22956 and JP-A 2001-354802)).

Further recently, it has become desired to improve the durability of the optical properties of the film in long-term use in wet heat environments, but conventional additives are ineffective for improving the film.

On the other hand, there is known a method of improving the properties of films by adding styrene/maleic anhydride additives to various resins. For example, there is disclosed an example of trying improving the wavelength dispersion characteristics of retardation of films by adding a styrene/maleic anhydride additive to a norbornene resin (JP-A 2001-337222); however, nothing is referred to therein relating to the improvement in the retardation of the films and to the usefulness of the styrenic additive under high-temperature high-humidity conditions. Also disclosed is an example of trying relieving the humidity dependence of films by adding a styrene/maleic anhydride additive to a cellulose acylate resin and further adding an antioxidant thereto (JP-A 2007-

304376); however, nothing is referred to therein relating to the optical properties of the films. A styrene/maleic anhydride additive has low solubility to a cellulose acylate resin and so it is hard to produce a clear and low haze film when the additives are used.

At present, as in the above, technical development is assiduously desired in the art for a transparent protective film and an optically-compensatory film for use for polarizers, which is excellent in the durability of the optical properties thereof that control display performance, for which the production process is not complicated, which does not whiten, and for which the materials are not expensive, for a polarizer comprising the film, and for a liquid crystal display device comprising it.

SUMMARY OF THE INVENTION

However, the present inventors' investigations have revealed that a cellulose acylate film containing an increased amount of an ordinary additive added thereto could not satisfy the wet heat durability of the optical properties of the film but on the contrary, the increase in the amount of the additive to be added to the film rather lowers the wet heat durability of the optical properties of the film. In addition, the investigations have further revealed that the mere addition of a known styrenic additive to a cellulose acylate film could not readily improve the wet heat durability of the optical properties of the film while keeping high retardation in the in-plane direction and in the thickness direction of the film.

Further, addition of too much additive has caused a problem in that the additive may precipitate on the surface of the film being formed or may form particles during saponification treatment or may form crystals. In other words, the method is ineffective for improving the wet heat durability of the optical properties of the film and additionally causes some problems in that the additive precipitates out in the web during formation of the cellulose acylate film in solution casting film formation and fouls the apparatus and the film itself, therefore degrading the quality and the producibility of the film.

The present inventors have developed a cellulose acylate film which has overcome the above-mentioned problems and is excellent in the wet heat durability of the retardation in the in-plane direction and the thickness-direction of the film, of which the haze is sufficiently low and which is useful for liquid crystal display devices.

A first object of the invention is to provide a cellulose acylate film of which the wet heat durability of the retardation in the in-plane direction and the thickness direction thereof is excellent, and of which the haze is sufficiently low, and to provide a method for producing it. A second object of the invention is to provide a polarizer and a piqued crystal display device produced by the use of the film.

For the purpose of solving the above-mentioned problems, the present inventors have investigated the styrene/maleic anhydride-based additive used in Patent Reference 6 and others, and have found that, in the conventional styrene/maleic anhydride-based additive, the ring opening of the maleic anhydride unit moiety is insufficiently controlled, and therefore the compatibility of the additive with cellulose acylate film is unsatisfactory. For example, in Patent Reference 6, a commercially-available, completely ring-closed, styrene/maleic anhydride-based additive having a degree of ring opening of 0%, or an esterified product of the styrene/maleic anhydride-based additive is used. Patent Reference 6 does not disclose the step of controlling the degree of esterification in producing the esterified product of the styrene/maleic anhydride-based additive, and therefore, in case where the maleic anhydride unit in the styrene/maleic anhydride-based additive is esterified, the esterification goes on completely to give a completely ring-opened, styrene/maleic anhydride-based additive having a degree of ring opening of 100%. In addition, Patent Reference 6 does not disclose the step where an alcohol is kept in contact with the styrene/maleic anhydride-based additive in film formation, and in this, therefore, the commercially-available, completely ring-closed, styrene/maleic anhydride-based additive having a degree of ring opening of 0% does not undergo partial ring opening. In that manner, according to the method described in Patent Reference 6, the maleic anhydride unit in the styrene/maleic anhydride-based additive could not be partly opened.

As opposed to this, the present inventors investigated the problem of how to control the degree of ring opening of the maleic anhydride unit in the styrene/maleic anhydride-based additive that had heretofore not been investigated in the art, and produced a solution containing a partially ring-opened, styrene/maleic anhydride-based additive and a cellulose acylate resin; and as a result, the inventors have found that, in the solution, the miscibility of cellulose acylate with the styrene/maleic anhydride additive is significantly increased. Further, the inventors cast the solution to form a cellulose acylate film, and have surprisingly found that the resulting film was improved in point of the in-plane and thickness-direction retardation change under a high-temperature high-humidity condition (wet heat durability) and a cellulose acylate film having a low haze can be obtained.

Specifically, as a result of assiduous studies, the inventors have provided the invention mentioned below.

[1] A method for producing a cellulose acylate film, comprising casting a solution comprising a cellulose acylate resin and a partially ring-opened, styrene/maleic anhydride copolymer.

[2] The method for producing a cellulose acylate film of [1], wherein the solution comprises at least one retardation enhancer.

[3] The method for producing a cellulose acylate film of [1] or [2], comprising bringing the styrene/maleic anhydride copolymer into contact with an ingredient capable of ring-opening the ring-closed acid anhydride structure moiety in the styrene/maleic anhydride copolymer.

[4] The method for producing a cellulose acylate film of any one of [1] to [3], comprising dipping the styrene/maleic anhydride copolymer in an alcohol-containing solution.

[5] The method for producing a cellulose acylate film of [4], wherein the alcohol is methanol.

[6] The method for producing a cellulose acylate film of any one of [3] to [5], further comprising mixing the resulting, partially ring-opened, styrene/maleic anhydride copolymer with a cellulose acylate resin after bringing the styrene/maleic anhydride copolymer into contact with an ingredient capable of ring-opening the ring-closed acid anhydride structure moiety in the styrene/maleic anhydride copolymer.

[7] The method for producing a cellulose acylate film of any one of [1] to [6], wherein the partially ring-opened, styrene/maleic anhydride copolymer is represented by the following Formula (1):

Formula (1)

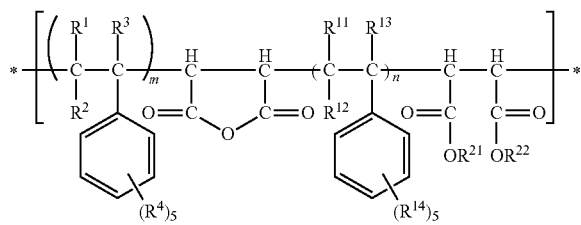

wherein m and n each indicate a natural number; $R^1$ to $R^4$, $R^{11}$ to $R^{14}$, $R^{21}$ and $R^{22}$ each independently represent a hydrogen atom or a monovalent substituent.

[8] The method for producing a cellulose acylate film of [7], wherein $R^1$ to $R^4$, $R^{11}$ to $R^{14}$, $R^{21}$ and $R^{22}$ each independently represent a hydrogen atom, a halogen atom, a substituted or unsubstituted hydrocarbon group having from 1 to 30 carbon atoms and optionally having a linking group containing an oxygen atom, a sulfur atom, a nitrogen atom or a silicon atom, or a polar group.

[9] The method for producing a cellulose acylate film of [7] or [8], wherein at least one of $R^{21}$ and $R^{22}$ represents a substituent derived from a polymer compound having a molecular weight of from 500 to 1000.

[10] The method for producing a cellulose acylate film of [7] or [8], wherein $R^{21}$ and $R^{22}$ each independently represent a hydrogen atoms, an alkenyl group having 3 to 12 carbon atoms, an alkyl group having 1 to 12 carbon atoms.

[11] The method for producing a cellulose acylate film of any one of [1] to [10], wherein the partially ring-opened, styrene/maleic anhydride copolymer has a degree of ring opening of from 10 to 90%.

[12] The method for producing a cellulose acylate film of any one of [1] to [11], wherein the partially ring-opened, styrene/maleic anhydride copolymer has a compositional ratio (St/MAn) of the styrene structure unit (St) to the partially ring-opened, maleic anhydride-derived structure unit (MAn) of from 1/1 to 4/1.

[13] The method for producing a cellulose acylate film of any one of [1] to [12], wherein the partially ring-opened, styrene/maleic anhydride copolymer has a weight-average molecular weight of from 500 to 100,000.

[14] The method for producing a cellulose acylate film of any one of [1] to [13], wherein the partially ring-opened, styrene/maleic anhydride copolymer is added in an amount of from 0.5 to 40 parts by mass relative to 100 parts by mass of the cellulose acylate resin.

[15] A cellulose acylate film produced by the method of any one of [1] to [14].

[16] The cellulose acylate film of [15], satisfying the following inequalities:

30 nm<Re<100 nm 80 nm<Rth<300 nm wherein Re represents an in-plane retardation of the film and Rth represents a thickness-direction retardation of the film.

[17] The cellulose acylate film of [15] or [16], having a haze of less than 1%.

[18] The cellulose acylate film of any one of [15] to [17], wherein the retardation in the plane of the film (Re) and the retardation in the thickness direction of the film (Rth) each independently change by from −10% to 10% after the cellulose acylate film is kept at 60° C. and relative humidity 90% for 150 hours.

[19] A polarizer comprising a polarizing element and the cellulose acylate film of any one of [15] to [18].

[20] A liquid crystal display device comprising the cellulose acylate film of any one of [15] to [18].

The cellulose acylate film of the invention is protected from the change in the retardation in the in-plane direction and the thickness direction thereof in long-term and high-temperature high-humidity conditions. In addition, the film is favorably used in TN-mode and VA-mode liquid crystal display devices. Further, the haze of the film is low, and the film is not whitened. Accordingly, the invention is favorable for a transparent protective film and an optically-compensatory film for polarizers, and for a polarizer and a liquid crystal display device comprising the film.

BEST MODE FOR CARRYING OUT THE INVENTION

Description will now be made in detail of the cellulose acylate film, method for producing it, polarizer and piqued crystal display device according to the invention. Although the following description of its structural features may often be made on the basis of typical embodiments of the invention, it is to be understood that the invention is not limited to any such embodiment. It is also to be noted that every numerical range as herein expressed by employing the words "from" and "to", or simply the word "to", or the symbol "~" is supposed to include the lower and upper limits thereof as defined by such words or symbol, unless otherwise noted. In the invention, "mass %" means equal to "weight %", and "% by mass" means equal to "% by weight".

[Method for Producing Cellulose Acylate Film]

The method for producing a cellulose acylate film of the invention (hereinafter this may be referred to as the production method of the invention) is characterized by casting a solution that contains a cellulose acylate resin and a partially ring-opened, styrene/maleic anhydride copolymer. The method for preparing the partially ring-opened, styrene/maleic anhydride copolymer is not specifically defined, and the copolymer may be produced in any known method as necessary.

<<Preparation of Partially Ring-Opened, Styrene/Maleic Anhydride Copolymer>>

Preferably, the production method of the invention includes a step of preparing the partially ring-opened, styrene/maleic anhydride copolymer prior to casting the solution that contains a cellulose acylate resin and the partially ring-opened, styrene/maleic anhydride copolymer.

<Partially Ring-Opened, Styrene/Maleic Anhydride Copolymer>

The partially ring-opened, styrene/maleic anhydride copolymer contains at least a styrene structure unit and a maleic anhydride-derived structure unit, and is characterized in that it contains, as the maleic anhydride-derived structure unit, both a structure unit where the two carboxyl groups of maleic acid are condensed together to form a ring-closed acid anhydride structure, and a structure unit where the two carboxyl groups of maleic acid are not condensed but form a ring-opened structure.

The structure of the partially ring-opened, styrene/maleic anhydride copolymer is shown by the following formula (1):

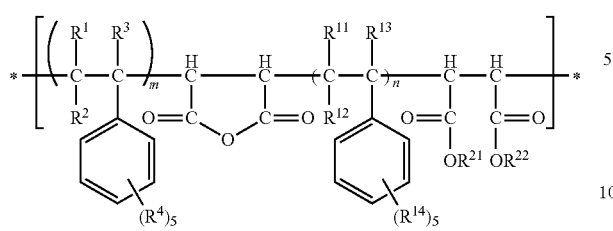

Formula (1)

(wherein m and n each indicate a natural number; $R^1$ to $R^4$, $R^{11}$ to $R^{14}$ and $R^{21}$ and $R^{22}$ each independently represent a hydrogen atom or a monovalent substituent).

$R^4$ and $R^{14}$ may be all the same atoms or groups or may be different atoms or groups, and may bond to each other to form a carbon ring or a hetero ring (the carbon ring and the hetero ring may have a monocyclic structure or a polycyclic structure as condensed with any other ring).

$R^{21}$ and $R^{22}$ may be each independently a substituent derived from a polymer compound having a molecular weight of from 500 to 1000 or so.

Preferably, the monovalent substituent for $R^1$ to $R^4$, $R^{11}$ to $R^{14}$ and $R^{21}$ and $R^{22}$ each is each independently a halogen atom; a substituted or unsubstituted hydrocarbon group having from 1 to 30 carbon atoms and optionally having a linking group containing an oxygen atom, a sulfur atom, a nitrogen atom or a silicon atom; or a polar group.

$R^{21}$ and $R^{22}$ each independently is more preferably a hydrogen atoms, an alkenyl group having 3 to 12 carbon atoms, an alkyl group having 1 to 12 carbon atoms, particularly preferably a alkyl group having 1 to 3 carbon atoms, further more preferably a methyl group.

$R^1$ to $R^4$, $R^{11}$ to $R^{14}$, $R^{21}$ and $R^{22}$ may have a substituent, and the examples of the substituents are those exemplified as a monovalent substituent which represents $R^1$ to $R^4$, $R^{11}$ to $R^{14}$, $R^{21}$ and $R^{22}$.

The styrene/maleic anhydride copolymer may be a block copolymer or a random copolymer, and also may be a graft copolymer.

The partially ring-opened, styrene/maleic anhydride copolymer has both the structural unit which two carboxyl groups in maleic acid are condensed each other to form the closed ring form of an anhydride and the structural unit which two carboxyl groups in maleic acid are not condensed each other to form the ring-opened form.

Hereinafter describes a structure of the structural unit which two carboxyl groups in maleic acid are condensed each other to form the closed ring form of an anhydride represented by the following formula (2); the structural unit which two carboxyl groups in maleic acid are not condensed each other to form the ring-opened form of an anhydride represented by the following formula (3)

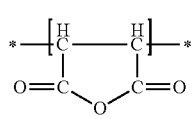

Formula (2)

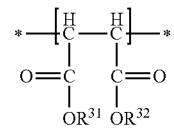

Formula (3)

In formula (3), $R^{31}$ and $R^{32}$ each independently represent a hydrogen atom or a monovalent substituent.

$R^{31}$ and $R^{32}$ each independently may be a substituent derived from a polymer having a molecular weight of 500 to 1,000.

$R^{31}$ and $R^{32}$ each independently is more preferably a hydrogen atoms, an alkenyl group having 3 to 12 carbon atoms, an alkyl group having 1 to 12 carbon atoms, particularly preferably a alkyl group having 1 to 3 carbon atoms, further more preferably a methyl group.

$R^{31}$ and $R^{32}$ may have a substituent, and the examples of the substituents are those exemplified as a monovalent substituent which represents $R^1$ to $R^4$, $R^{11}$ to $R^{14}$, $R^{21}$ and $R^{22}$.

As an example of the ring-opened structure where the two carboxyl groups of maleic acid are not condensed but are opened, there is mentioned a structure where the two carboxyl groups exist as a carboxyl group, an ion derived from a carboxyl group by removing the hydrogen ion from it, a salt with any other cation, or an ester formed with an alcohol. Of those, in the invention, preferred is a structure where one of the two carboxyl groups of maleic acid is an ester formed with an alcohol and the other is a carboxyl group or an ion derived from a carboxyl group by removing the hydrogen ion from it, from the viewpoint that the structure prevents the once-formed ring-opened structure from being again closed to be a ring-closed structure, and the degree of ring opening is thereby stabilized.

The partially ring-opened, styrene/maleic anhydride copolymer in the invention has a degree of ring opening defined by the following formula (as percentage) is more than 0% to less than 100%.

(Degree of Ring Opening)=[(number of structure units where the two carboxyl groups of maleic acid are not condensed to each other but form a ring-opened structure)/(number of structure units derived from maleic anhydride)]×100%.

The degree of ring opening is preferably from 1 to 99% from the viewpoint of reducing the haze of the cellulose acylate film to be formed, more preferably from 5 to 95%, even more preferably from 10 to 90%.

The preferred range of the degree of ring opening may vary depending on the total degree of acyl substitution in the cellulose acylate resin and on St/MAn.

Concretely, the preferred range of the degree of ring opening may differ between the case where the total degree of acyl substitution in the cellulose acylate resin is from 2.1 to less than 2.40, and the case where it is from 2.40 to less than 2.7, and the case where it is from 2.7 to 2.95. Further, the preferred range of the degree of ring opening may vary depending on the combination of the total degree of acyl substitution in the cellulose acylate resin and St/MAn.

In addition, the preferred range of the degree of ring opening may vary depending on the total degree of acyl substitution in any case where the cellulose acylate resin is a cellulose acetate propionate or where the cellulose acylate resin is a cellulose acetate.

(Styrenic Structural Unit)

The styrenic structural units are derived from aromatic vinylic monomers and are represented by the following formula (A):

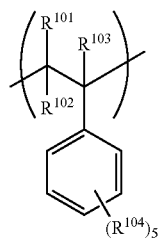

Formula (A)

wherein $R^{101}$ to $R^{104}$ each independently represent a hydrogen atom; a halogen atom; a substituted or unsubstituted hydrocarbon group having from 1 to 30 carbon atoms and optionally having a linking group containing an oxygen atom, a sulfur atom, a nitrogen atom or a silicon atom; or a polar group. $R^{104}$'s may be all the same atoms or groups, or may be different atoms or groups, and they may bond to each other to form a carbon ring or a hetero ring (the carbon ring or the hetero ring may have a monocyclic structure or may have a polycyclic structure condensed with any other ring).

Specific examples of the aromatic vinylic monomer include styrene; alkyl-substituted styrenes such as α-methylstyrene, β-methylstyrene, o-methylstyrene, m-methylstyrene, p-methylstyrene; halogen-substituted styrenes such as 4-chlorostyrene, 4-bromostyrene; hydroxystyrenes such as o-hydroxystyrene, m-hydroxystyrene, p-hydroxystyrene, α-methyl-p-hydroxystyrene, 2-methyl-4-hydroxystyrene, 3,4-dihydroxystyrene; vinylbenzyl alcohols; alkoxy-substituted styrenes such as p-methoxystyrene, p-tert-butoxystyrene, m-tert-butoxystyrene; vinylbenzoic acids such as 3-vinylbenzoic acid, 4-vinylbenzoic acid; vinylbenzoates such as methyl 4-vinylbenzoate, ethyl 4-vinylbenzoate; 4-vinylbenzyl acetate; 4-acetoxystyrene; amidestyrenes such as 2-butylamidostyrene, 4-methylamidestyrene, p-sulfonamidestyrene; aminostyrenes such as 3-aminostyrene, 4-aminostyrene, 2-isopropenylaniline, vinylbenzyldimethylamine; nitrostyrenes such as 3-nitrostyrene, 4-nitrostyrene; cyanostyrenes such as 3-cyanostyrene, 4-cyanostyrene; vinylphenylacetonitrile; arylstyrenes such as phenylstyrene; indenes, etc. However, the invention should not be limited to these examples. Two or more different such monomers may be copolymerized to give copolymers for use herein. Of those, preferred are styrene and α-methylstyrene, from the viewpoint that they are easily available industrially and are inexpensive.

As the styrene/maleic anhydride copolymer of the invention, it is particularly preferable that $R^1$ to $R^4$, $R^{11}$ to $R^{14}$ and $R^{101}$ to $R^{104}$ represent a hydrogen atom, $R^{21}$ and $R^{22}$ represent a methyl group, a propyl group or a butyl group; further preferable that $R^{21}$ and $R^{22}$ represent a methyl group.

(Compositional Ratio of Partially Ring-Opened, Styrene/Maleic Anhydride Copolymer)

The compositional ratio of the styrene structure unit to the partially ring-opened, maleic anhydride-derived structure unit (hereinafter this may be referred to as St/MAn, or compositional ratio of St/MAn) is at least 1/1. Specifically, in the partially ring-opened, styrene/maleic anhydride copolymer for use in the invention, the partially ring-opened, maleic anhydride-derived structure unit is not continuously polymerized.

Depending on the total degree of acyl substitution in the cellulose acylate resin for use in the invention, St/MAn is preferably from 1/1 to 4/1, more preferably from 1/1 to less than 4/1, even more preferably from 1/1 to 3/1, still more preferably from 1/1 to 2/1. When St/MAn is at most 4/1, then the compatibility of the partially ring-opened, styrene/maleic anhydride copolymer with a cellulose acylate resin may be good, even though the total degree of acyl substitution in the cellulose acylate resin is less than 3.

The partially ring-opened form of the styrene/maleic anhydride copolymer may be a copolymer having only partially ring-opened form of a maleic anhydride structural unit and a styrene structural unit and, or may have some other copolymer element adding to a partially ring-opened form of a maleic anhydride structural unit and styrene structural unit.

For the example of the other copolymer element, exemplified a structural unit derived from a monomer which described below as other monomers. Said other monomers are not specifically defined. For example, they include acrylic acid, methacrylic acid, alkyl acrylate (e.g., methyl acrylate, ethyl acrylate), alkyl methacrylate (e.g., methyl methacrylate, ethyl methacrylate), aminoalkyl acrylate (e.g., diethylaminoethyl acrylate), aminoalkyl methacrylate, monoester of acrylic acid and glycol, monoester of methacrylic acid and glycol (e.g., hydroxyethyl methacrylate), alkali metal salt of acrylic acid, alkali metal salt of methacrylic acid, ammonium salt of acrylic acid, ammonium salt of methacrylic acid, quaternary ammonium derivative of aminoalkyl acrylate, quaternary ammonium derivative of aminoalkyl methacrylate, quaternary ammonium compound of diethylaminoethyl acrylate and methyl sulfate, vinyl methyl ether, vinyl ethyl ether, alkali metal salt of vinylsulfonic acid, ammonium salt of vinylsulfonic acid, styrenesulfonic acid, styrenesulfonic acid salt, allylsulfonic acid, allylsulfonic acid salt, methallylsulfonic acid, methallylsulfonic acid salt, vinyl acetate, vinyl stearate, N-vinylimidazole, N-vinylacetamide, N-vinylformamide, N-vinylcaprolactam, N-vinylcarbazole, acrylamide, methacrylamide, N-alkylacrylamide, N-methylolacrylamide, N,N-methylenebisacrylamide, glycol diacrylate, glycol dimethacrylate, divinylbenzene, glycol diallyl ether, etc.

As still other comonomers than those mentioned above for use in the invention as other copolymerizable ingredients, there are mentioned comonomers excellent in copolymerizability with the styrene monomer mentioned above, and their examples include acid anhydrides such as citraconic anhydride, cis-1-cyclohexene-1,2-dicarboxylic anhydride, 3-methyl-cis-1-cyclohexene-1,2-dicarboxylic anhydride, 4-methyl-cis-1-cyclohexene-1,2-dicarboxylic anhydride, etc.; nitrile group-having radical-polymerizing monomers such as acrylonitrile, methacrylonitrile, etc.; amide bond-having radical-polymerizing monomers such as acrylamide, methacrylamide, trifluoromethanesulfonylaminoethyl (meth) acrylate, etc.; fatty acid vinyl esters such as vinyl acetate, etc.; chlorine-having radical-polymerizing monomers such as vinyl chloride, vinylidene chloride, etc.; conjugated diolefins such as 1,3-butadiene, isoprene, 1,4-dimethylbutadiene, etc.; however, the invention should not be limited to these.

Of those other monomers, preferred are vinyl acetate, acrylate, methacrylate and a structural unit derived from a acrylate ester monomer represented by the following formula (B):

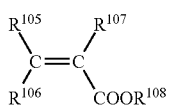

Formula (B)

wherein. $R^{105}$ to $R^{108}$ each independently represent a hydrogen atom; a halogen atom; a substituted or unsubstituted hydrocarbon group having from 1 to 30 carbon atoms optionally having a linking group containing an oxygen atom, a sulfur atom, a nitrogen atom or a silicon atom; or a polar group.

Examples of the acrylate monomers include, for example, methyl acrylate, ethyl acrylate, (i-, n-)propyl acrylate, (n-, i-, s-, tert-)butyl acrylate, (n-, i-, s-)pentyl acrylate, (n-, i-)hexyl acrylate, (n-, 1-)heptyl acrylate, (n-, i-)octyl acrylate, (n-, i-)nonyl acrylate, (n-, i-)myristyl acrylate, (2-ethylhexyl)acrylate, (ε-caprolactone) acrylate, (2-hydroxyethyl) acrylate, (2-hydroxypropyl)acrylate, (3-hydroxypropyl acrylate, (4-hydroxybutyl)acrylate, (2-hydroxybutyl)acrylate, (2-methoxyethyl)acrylate, (2-ethoxyethyl)acrylate, phenyl acrylate, phenyl methacrylate, (2 or 4-chlorophenyl)acrylate, (2 or 4-chlorophenyl)methacrylate, (2 or 3 or 4-ethoxycarbonylphenyl)acrylate, (2 or 3 or 4-ethoxycarbonylphenyl)methacrylate, (o or in or p-tolyl)acrylate, (o or m or p-tolyl)methacrylate, benzyl acrylate, benzyl methacrylate, phenethyl acrylate, phenethyl methacrylate, (2-naphthyl)acrylate, cyclohexyl acrylate, cyclohexyl methacrylate, (4-methylcyclohexyl)acrylate, (4-methylcyclohexyl)methacrylate, (4-ethylcyclohexyl)acrylate, (4-ethylcyclohexyl)methacrylate, and methacrylates corresponding to the above-mentioned acrylates. However, the invention should not be limited to these examples. Two or more such monomers may be copolymerized into copolymers for use herein. Of those, preferred are methyl acrylate, ethyl acrylate, (i-, n-)propyl acrylate, (n-, i-, s-, text-)butyl acrylate, (n-, i-, s-) pentyl acrylate, (n-, i-)hexylacrylate, and methacrylates corresponding to these acrylates, from the viewpoint that they are easily available industrially and are inexpensive.

Of those other monomers, particularly preferred are vinyl acetate, acrylic acid, methacrylic acid, and methyl acrylate, more preferred are vinyl acetate and methyl acrylate, further preferred is vinyl acetate.

In case where the partially ring-opened, styrene/maleic anhydride copolymer is a copolymer of a partially ring-opened structure unit derived from maleic anhydride with a styrene structure unit and any other comonomer unit than the styrene structure unit, the compositional ratio of the partially ring-opened, maleic anhydride-derived structure unit and the styrene structure unit to the other comonomer-derived structure unit is preferably from 1/9 to 10/0, more preferably from 5/5 to 10/0, even more preferably from 7/3 to 10/0.

(Weight-Average Molecular Weight)

The weight-average molecular weight of the partially ring-opened, styrene/maleic anhydride copolymer is preferably from 500 to 100,000, more preferably from 1,000 to 80,000, particularly preferably from 1,500 to 15,000.

Having a molecular weight of at least 500, the evaporative of the polymer having a negative birefringence is low and it is preferable; while having a molecular weight of at most 100,000, the miscibility of the polymer having a negative birefringence with cellulose acylate resin is be good which makes productivity of the cellulose acylate film good; and both are favorable.

(Amount of Addition)

The amount of the partially ring-opened, styrene/maleic anhydride copolymer to be added is preferably from 0.5 to 40 parts by mass relative to 100 parts by mass of the cellulose acylate resin, more preferably from 0.5 to 30 parts by mass, even more preferably from 1 to 20 parts by mass, further more preferably from 2 to 10 parts by mass.

<Method for Preparing Partially Ring-Opened, Styrene/Maleic Anhydride Copolymer>

Preferably, the production method of the invention includes a step of bringing the ring-closed acid anhydride structure moiety in the styrene/maleic anhydride copolymer into contact with an ingredient capable of ring-opening the closed structure. Preferably, the invention includes a step of bringing the styrene/maleic anhydride copolymer into contact with an ingredient capable of ring-opening the ring-closed acid anhydride structure moiety in the styrene/maleic anhydride copolymer, thereby ring-opening the ring-closed structure of the acid anhydride.

The partially ring-opened, styrene/maleic anhydride copolymer can be prepared by reacting a commercially-available styrene/maleic anhydride copolymer of which the degree of ring opening is 0%, with an ingredient capable of ring-opening the structure unit where the two carboxyl groups of maleic acid are condensed to each other to form a ring-closed acid anhydride structure, under the control that the degree of ring opening does not reach 100% but could be a desired degree of ring opening. On the contrary, the copolymer may also be prepared by reacting a styrene/maleic acid copolymer of which the degree of ring opening is 100%, with an ingredient capable of ring-closing the maleic acid moiety in the styrene/maleic acid copolymer under the control that the degree of ring opening does not reach 0% but could be a desired degree of ring opening.

The ingredient capable of ring-opening the structure unit of forming the ring-closed acid anhydride structure includes, for example, alcoholic hydroxyl group-having compounds, phenolic hydroxyl group-having compounds, water, inorganic acids, organic acids, etc.; and of those, preferred are alcoholic hydroxyl group-having compounds. The alcoholic hydroxyl group-having compounds are preferably linear or branched alcohols having from 1 to 12 carbon atoms, more preferably linear alcohols having from 1 to 6 carbon atoms, even more preferably methanol, propanol and butanol from the viewpoint of the reactivity thereof; and especially preferred is methanol from the viewpoint of the reactivity and the compatibility thereof with the ring-closed copolymer.

The method of bringing the styrene/maleic anhydride copolymer into contact with the ingredient capable of ring-opening the structure unit of forming the ring-closed acid anhydride structure is not specifically defined, for which, for example, the two may be kept in contact with each other in the form of solution, or may be in vapor. Preferably, however, the copolymer is dipped in a solution containing the ingredient capable of ring-opening the structure unit of forming the ring-closed acid anhydride structure.

Preferably, the production method of the invention includes a step of dipping the styrene/maleic anhydride copolymer in an alcohol-containing solution. Specifically, it is desirable that the production method of the invention includes a step of dipping the styrene/maleic anhydride copolymer in an alcohol-containing solution to thereby ring-open the ring-closed acid anhydride structure moiety in the styrene/maleic anhydride copolymer.

Preferably, the degree of ring opening of the partially ring-opened, styrene/maleic anhydride copolymer is accurately controlled by controlling the ratio of the molar number of the structure unit of forming the ring-closed acid anhydride structure to the molar number of the ingredient capable of ring-opening the structure unit of forming the ring-closed acid anhydride structure. In case where a styrene/maleic anhydride copolymer of which the degree of ring opening is 0% is used, the molar number of the structure unit of forming the ring-closed acid anhydride structure is computed from the compositional ratio of St/MAn, and then the amount to be added of the ingredient capable of ring-opening the structure unit of forming the ring-closed acid anhydride structure may be controlled in accordance with the desired degree of ring opening. From the viewpoint of preventing the fluctuation of the controlled degree of ring opening of the ring-opened moiety in the styrene/maleic anhydride copolymer in the subsequent step of producing a cellulose acylate film, it is desirable that the reaction of the copolymer with the ingredient capable of ring-opening the structure unit of forming the ring-closed acid anhydride structure is promoted up to the equilibrium point of the reaction. Further, it is also desirable that the copolymer is prepared in such a manner that the degree of ring opening thereof does not fluctuate when the copolymer is mixed with a cellulose acylate resin and other additives such as a retardation enhancer in the subsequent step of preparing a cellulose acylate dope to be mentioned below. In addition, the degree of ring opening of the copolymer may be kept stable by controlling the degree of progression of the ring-opening reaction according to a known reaction-stopping method.

The degree of ring opening of the partially ring-opened, styrene/maleic anhydride copolymer may be measured according to a known method. In case where the degree of ring opening of the styrene/maleic anhydride copolymer to be used as the starting material in the production method of the invention is unknown, the degree of ring opening of the starting copolymer may be previously measured.

In the production method of the invention, the styrene/maleic anhydride copolymer that is used as the starting material for the partially ring-opened, styrene/maleic anhydride copolymer may be any known one, and this may be commercially available or may be produced through synthesis. Commercially-available styrene/maleic anhydride copolymers include, for example, SMA1000 (trade name by Sartomer, St/MAn=1/1, ring-closed copolymer), SMA2000 (trade name by Sartomer, St/MAn=2/1, ring-closed copolymer), SMA3000 (trade name by Sartomer, St/MAn=3/1, ring-closed copolymer), etc. SMA1000 is hydrophobic and is immiscible with cellulose acylate having a degree of acetyl substitution of 2.43. As compared with SMA1000, SMA2000 is more hydrophobic and is more immiscible with cellulose acylate having a degree of acetyl substitution of 2.43.

<<Preparation of Cellulose Acylate Dope>>

The method for producing the cellulose acylate film of the invention includes casting a solution having a cellulose acylate and the partially ring-opened, styrene/maleic anhydride (solvent casting method). In the solvent casting method, the film is produced with a solution in which a cellulose acylate is dissolved (hereinafter this may be referred to as "dope").

[Cellulose Acylate]

The cellulose acylate for use for the cellulose acylate film of the invention is obtained through substitution of the hydroxyl group of the glucose unit that constitutes the cellulose acylate, with an acyl group.

Cellulose used as a starting material in preparation for the cellulose acylate used in the invention includes cotton linter and wood pulp (broadleaf pulp, coniferous pulp), etc. Any cellulose acylate obtained from any of such a starting cellulose may be used. As the case may be, a mixture of different cellulose acylates may also be used herein. The details of the cellulose as a starting material are described, for example, in "Plastic Material Lecture (17), Cellulosic Resin" (written by Marusawa, Uda, published by Nikkan Kogyo Shinbun-sha, 1970); and Hatsumei Kyokai Disclosure Bulletin 2001-1745 (pp. 7-8). Cellulose used in the cellulose acylate film of the invention is not specifically limited.

(Cellulose Acylate)

Description will first be made in detail of the cellulose acylate preferably used for the invention. The glucose units having a β-1, 4 bond and forming the cellulose have free hydroxyl groups in the 2-, 3- and 6-positions thereof. The cellulose acylate is a polymer obtained by esterifying a part or all of those hydroxyl groups with an acyl group. Its degree of acyl substitution means the total of the esterification degrees of cellulose in each 2-, 3- and 6-position (an esterification degree in each position of 100% meaning a substitution degree of 1).

(Degree of Substitution)

The total degree of acyl substitution (DS), which means the sum of the degree of substitution with each acyl group, is preferably $2.1 \leq DS \leq 2.95$, more preferably $2.2 \leq DS \leq 2.85$, even more preferably $2.4 \leq DS \leq 2.8$. Having a total degree of acyl substitution that falls within the range, water vapor permeation resistance and retardation of the film can be greatly enhanced, and the display performance stability of liquid crystal display devices comprising the film can be enhanced further more. Preferably, $DS6/(DS2+DS3+DS6)$ is at least 0.32, more preferably at least 0.322, even more preferably from 0.324 to 0.340. DS2 is a degree of substitution with an acyl group of the 2-positioned hydroxyl group of the glucose unit constituting the cellulose ester (hereinafter this may be referred to as "degree of 2-position acyl substitution"); DS3 is a degree of substitution with an acyl group of the 3-positioned hydroxyl group (hereinafter this may be referred to as "degree of 3-position acyl substitution"); DS6 is a degree of substitution with an acyl group of the 6-positioned hydroxyl group (hereinafter this may be referred to as "degree of 6-position acyl substitution"). $DS6/(DS2+DS3+DS6)$ indicates the ratio of the degree of 6-position acyl substitution to the total degree of substitution (hereinafter this may be referred to as "ratio of 6-position acyl substitution").

(Acyl Group)

One or more different types of acyl groups may be in the cellulose acylate in the invention. Preferably, the cellulose acylate film of the invention has a substituent of an acyl group having from 2 to 4 carbon atoms. In case where the cellulose acylate film has two or more different types of acyl groups, preferably, one of them is an acetyl group. As the other acyl group having from 2 to 4 carbon atoms than the acetyl group, preferred are a propionyl group and a butyryl group. The sum total of the degree of substitution with an acetyl group of the 2-positioned, 3-positioned and 6-positioned hydroxyl groups is referred to as DSA; and the sum total of the degree of substitution with a propionyl or butyryl group of the 2-positioned, 3-positioned and 6-positioned hydroxyl groups is referred to as DSB. Preferably, the value of DSA+DSB is $2.0 \leq DSA+DSB \leq 2.7$, more preferably $2.3 \leq DSA+DSB \leq 2.65$, even more preferably $2.4 \leq DSA+DSB \leq 2.6$. When DSA and DSB are specifically defined to fall within the above range, it is favorable since films of which Re and Rth change little depending on the ambient humidity, can be obtained.

Preferably, at least 28% of DSB is a degree of substitution of the 6-positioned hydroxyl group; more preferably at least 30% thereof is a degree of substitution of the 6-positioned hydroxyl group; even more preferably at least 31% thereof is a degree of substitution of the 6-positioned hydroxyl group;

still more preferably at least 32% thereof is a degree of substitution of the 6-positioned hydroxyl group;

The acyl group in the cellulose acylate used in the invention may be an aliphatic group or an aryl group, and are not particularly limited. They may be an alkylcarbonyl ester of cellulose, an alkenylcarbonyl ester of cellulose, an aromatic carbonyl ester of cellulose or an aromatic alkylcarbonyl ester of cellulose. These esters may have a substituent. Preferable examples of the substituents include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a tert-butanoyl group, a cyclohexanecarbonyl group, an oleoyl group, a benzoyl group, a naphthylcarbonyl group and a cinnamoyl group. An acetyl group, a propionyl group, a butanoyl group, a dodecanoyl group, an octadecanoyl group, a tert-butanoyl group, an oleoyl group, a benzoyl group, a naphthylcarbonyl group and a cinnamoyl group are more preferred, and an acetyl group, a propionyl group and a butanoyl group are particularly preferred, and the most preferred is an acetyl group.

In acylation of cellulose, when an acid anhydride or an acid chloride is used as the acylating agent, the organic solvent as the reaction solvent may be an organic acid, such as acetic acid, or methylene chloride or the like.

When the acylating agent is an acid anhydride, the catalyst is preferably a protic catalyst such as sulfuric acid; and when the acylating agent is an acid chloride (e.g., $CH_3CH_2COCl$), a basic compound may be used as the catalyst.

A most popular industrial production method for a mixed fatty acid ester of cellulose comprises acylating cellulose with a fatty acid corresponding to an acetyl group and other acyl groups (e.g., acetic acid, propionic acid, valeric acid, etc.), or with a mixed organic acid ingredient containing their acid anhydride.

The cellulose ester for use in the invention can be produced, for example, according to the method described in JP-A 10-45804.

<Retardation Enhancer>

The method for producing the cellulose acylate film of the invention includes casting a solution having a cellulose acylate and the partially ring-opened, styrene/maleic anhydride. The solution preferably further includes at least one retardation enhancer. In the invention, a retardation enhancer may be added or not. The retardation enhancer is preferably added to the film for making the film have a preferable retardation. The retardation enhancer for use in the invention includes rod-shaped compounds, discotic compounds and compounds having a positive birefringence. Of the rod-shaped or discotic compounds, those having at least two aromatic groups are preferred for use as the retardation enhancer in the invention. The amount of the retardation enhancer of a rod-shaped compound to be added is preferably from 0.1 to 30 parts by mass relative to 100 parts by mass of the cellulose acylate-containing polymer ingredient, more preferably from 0.5 to 20 parts by mass. Preferably, the amount of a discotic retardation enhancer to be added is preferably from 0.05 to 20 parts by mass relative to 100 parts by mass of the cellulose acylate resin, more preferably from 1.0 to 15 parts by mass, even more preferably from 3.0 to 10 parts by mass.

A discotic compound is superior to a rod-shaped compound as an Rth retardation enhancer, and is therefore favorably used in ace where the film requires an especially large Rth retardation. Two or more different types of retardation enhancers may be used, as combined.

Preferably, the retardation enhancer has a maximum absorption in a wavelength range of from 250 to 400 nm, and preferably, it does not have substantial absorption in a visible light region.

In the invention, the above-mentioned positive birefringent compounds are preferred as the retardation enhancer, among the above-mentioned rod-shaped or discotic compounds and the above-mentioned birefringent compounds, from the viewpoint that the haze of the cellulose acylate film to be produced may be reduced when the retardation enhancer is combined with the partially ring-opened, styrene/maleic anhydride copolymer in producing the film.

(1) Discotic Compound

Description will be given about the discotic compound. As the discotic compound, a compound having at least two aromatic rings can be employed.

In the specification, an "aromatic ring" includes an aromatic heteroring, in addition to an aromatic hydrocarbon ring. For the discotic compounds for use in the invention, for example, compounds described in JP-A 2008-181105 [0038] to [0045] may be exemplified.

A compound represented by following formula (I) may be also used for the discotic compound.

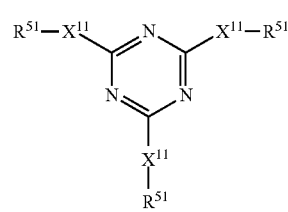

Formula (I)

In the above formula (I):

$R^{51}$ each independently represents an aromatic group or a heterocyclic group having at least one substituent at any of the ortho-, meta- and para-positions.

$X^{11}$ each independently represents a single bond or $-NR^{52}-$. $R^{52}$ each independently represents a hydrogen atom, or a substituted or unsubstituted alkyl, alkenyl, aryl or heterocyclic group.

The aromatic group represented by $R^{51}$ is preferably a phenyl ring or a naphthyl ring, particularly preferably a phenyl ring. The aromatic group represented by $R^{51}$ may have at least one substituent in any one of substitution positions. For the example of the above-mentioned substituent, a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, a sulfamoyl group, an alkyl substituted sulfamoyl group, an alkenyl substituted sulfamoyl group, an aryl substituted sulfamoyl group, a sulfoneamide group, a carbamoyl group, an alkyl substituted carbamoyl group, an alkenyl substituted carbamoyl group, an aryl substituted carbamoyl group, an amide group, an alkylthio group, an alkenylthio group, an arylthio group and an acyl group are included.

The heterocyclic group represented by $R^{51}$ is preferably aromatic. The aromatic heterocyclic group is generally an unsaturated heterocyclic group, and is preferably a heterocyclic group having maximum double bonds. The hetero ring of the heterocyclic group is preferably a 5-membered ring, a 6-membered ring or a 7-membered ring, more preferably a 5-membered ring or a 6-membered ring, most preferably a 6-membered ring. The hetero atom constituting the heterocyclic group is preferably a nitrogen atom, a sulfur atom or an oxygen atom, more preferably a nitrogen atom. The aromatic hetero ring is especially preferably a pyridine ring (as the heterocyclic group, a 2-pyridyl or 4-pyridyl group). The heterocyclic group may have a substituent. Examples of the substituent for the heterocyclic group may be the same as those mentioned hereinabove for the substituent of the aromatic group.

The heterocyclic group in a case where $X^{11}$ is a single bond is preferably a heterocyclic group having a chemical bond at the nitrogen atom. The hetero ring of the heterocyclic group having a chemical bond at the nitrogen atom is preferably a 5-membered ring, a 6-membered ring or a 7-membered ring, more preferably a 5-membered ring or a 6-membered ring, most preferably a 5-membered ring. The heterocyclic group may have plural nitrogen atoms. The heterocyclic group may have any other hetero atom (e.g., O, S) than the nitrogen atom. Examples of the heterocyclic group having a chemical bond at the nitrogen atom are shown below. $C_4H_9{}^n$ represents normal $C_4H_9$.

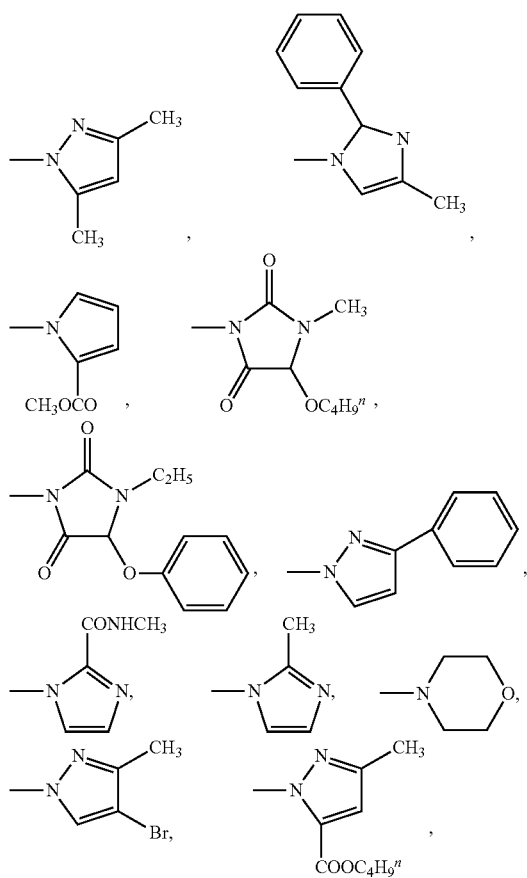

The alkyl group represented by $R^{52}$ may be a cycloalkyl group or a chain alkyl group, preferably a chain alkyl group. A straight chain alkyl group is more preferred to a branched chain alkyl group. Number of the carbon atoms of the alkyl group is preferably 1-30, more preferably 1-20, further preferably 1-10, further more preferably 1-8, and most preferably 1-6. The alkyl group may have a substituent. An example of the substituent includes a halogen atom, an alkoxy group (for example, a methoxy group, an ethoxy group) and an acyloxy group (for example, an acryloyloxy group, a methacryloyloxy group).

The alkenyl group represented by $R^{52}$ may be an cyclo alkenyl group or a chain alkenyl group, preferably a chain alkenyl group. A straight chain alkenyl group is more preferred to a branched chain alkyl group. Number of the carbon atoms of the alkyl group is preferably 2-30, more preferably 2-20, further preferably 2-10, further more preferably 2-8, and most preferably 2-6. The alkenyl group may have a substituent. As the substituents, those for the above-mentioned alkyl group can be used.

The aryl group and heterocyclic group represented by $R^{52}$ and their preferable groups are as described in $R^{51}$ above. The aryl group and the heterocyclic group may have a substituent further, and examples of the substituent are the same as those for $R^{51}$.

The compound represented by formula (1) can be produced by, for example, a method given in the JP-A 2003-344655, and details are described in Hatsumei Kyokai Disclosure Bulletin 2001-1745 (p. 49).

(2) Rod-Shaped Compound

In the invention, rod-shaped compounds having a linear molecular structure are also usable preferably in addition to the discotic compound. For the rod-shaped compounds for use in the invention, for example, compounds described in JP-A 2007-368898 [0053] to [0095] may be exemplified.

(3) Compound Having a Positive Birefringence

A compound having a positive birefringence means a polymer of such that, when light has come to a layer formed of the molecules thereof as aligned monoaxially, then the refractive index of the light in the alignment direction is larger than the refractive index of the light in the direction perpendicular to the alignment direction.

As the compound having a positive birefringence, is not limited, includes a polymer having a positive intrinsic birefringence such as polyamide, polyimide, polyester, polyetherketone, polyamideimide and polyesterimide, preferably polyetherketone and polyester-type polymers, more preferably polyester-type polymers.

The polyester-type polymers is one produced by reaction of a mixture of an aliphatic dicarboxylic acid having from 2 to 20 carbon atoms and an aromatic dicarboxylic acid having from 8 to 20 carbon atoms, and a diol selected from the group consisting of aliphatic diols having from 2 to 12 carbon atoms, alkyl ether diols having from 4 to 20 carbon atoms and aromatic diols having from 6 to 20 carbon atoms. Both ends of the reaction product may be as such, or may be blocked by further reaction with monocarboxylic acids, monoalcohols or phenols. The terminal blocking may be effected for the reason that the absence of a free carboxylic acid in the plasticizer is effective for the storability of the plasticizer. The dicarboxylic acid for the polyester plasticizer for use in the invention is preferably an aliphatic dicarboxylic having from 4 to 20 carbon atoms, or an aromatic dicarboxylic acid having from 8 to 20 carbon atoms.

The aliphatic dicarboxylic acids having from 2 to 20 carbon atoms preferably include, for example, oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexanedicarboxylic acid.

The aromatic dicarboxylic acids preferably for use in the film of the invention having from 8 to 20 carbon atoms include phthalic acid, terephthalic acid, isophthalic acid, 1,5-naphthalene dicarboxylic acid, 1,4-naphthalene dicarboxylic acid, 1,8-naphthalene dicarboxylic acid, 2,8-naphthalene dicarboxylic acid, 2,6-naphthalene dicarboxylic acid, etc.

More preferred aliphatic dicarboxylic acids in these are malonic acid, succinic acid, maleic acid, fumaric acid, glutaric acid, adipic acid, azelaic acid, 1,4-cyclohexanedicarboxylic acid. More preferred aromatic dicarboxylic acids in these are phthalic acid, terephthalic acid, isophthalic acid, 1,5-naphthalene dicarboxylic acid and 1,4-naphthalene dicarboxylic acid. Particularly preferred aliphatic dicarboxylic acids are succinic acid, glutaric acid and adipic acid and particularly preferable aromatic dicarboxylic acids are phthalic acid, terephthalic acid and isophthalic acid.

At least one kind of above-mentioned aliphatic dicarboxylic acid and at least one kind of the aromatic dicarboxylic acid are used in combination. The combination of these acids is not limited and several kinds of each ingredient may be used in combination.

The diol and the aromatic diol used for the compound having a positive birefringence are selected, for example, from aliphatic diols having from 2 to 20 carbon atoms, alkyl ether diols having from 4 to 20 carbon atoms, and aromatic diols having from 6 to 20 carbon atoms.

Examples of the aliphatic diol having from 2 to 20 carbon atoms include an alkyldiol and an alicyclic diol. For example, an ethandiol, 1,2-propandiol, 1,3-propandiol, 1,2-butandiol, 1,3-butandiol, 2-methyl-1,3-propandiol, 1,4-butandiol, 1,5-pentandiol, 2,2-dimethyl-1,3-propandiol (neopentyl glycol), 2,2-diethyl-1,3-propandiol (3,3-dimethylolpentane), 2-n-buthyl-2-ethyl-1,3-propandiol (3,3-dimethylolheptane), 3-methyl-1,5-pentandiol, 1,6-hexandiol, 2,2,4-trimethyl-1,3-pentandiol, 2-ethyl-1,3-hexandiol, 2-methyl-1,8-octandiol, 1,9-nonandiol, 1,10-decandiol, 1,12-octadecandiol, etc. One or more of these glycols may be used either singly or as combined mixture.

Specific examples of preferred aliphatic diols include an ethandiol, 1,2-propandiol, 1,3-propandiol, 1,2-butandiol, 1,3-butandiol, 2-methyl-1,3-propandiol, 1,4-butandiol, 1,5-pentandiol, 3-methyl-1,5-pentandiol, 1,6-hexandiol, 1,4-cyclohexandiol, 1,4-cyclohexandimethanol. Particularly preferred examples include ethandiol, 1,2-propandiol, 1,3-propandiol, 1,2-butandiol, 1,3-butandiol, 1,4-butandiol, 1,5-pentandiol, 1,6-hexandiol, 1,4-cyclohexandiol, 1,4-cyclohexanedimethanol.

Specific examples of preferred alkyl ether diols having from 4 to 20 carbon atoms are polytetramethylene ether glycol, polyethylene ether glycol, polypropylene ether glycol, and combinations of these. The average degree of polymerization is not limited in particular, and it is preferably from 2 to 20, more preferably 2 to 10, further preferably from 2 to 5, especially preferably from 2 to 4. As these examples, Carbowax resin, Pluronics resin and Niax resin are commercially available as typically useful polyether glycols.

Specific examples of aromatic diols having from 6 to 20 carbon atoms, not limited, include Bisphenol A, 1,2-hydroxybenzene, 1,3-hydroxybenzene, 1,4-hydroxybenzene, 1,4-dimethylolbenzene, and preferably include bisphenol A, 1,4-hydroxybenzene and 1,4-dimethylolbenzene.

In the invention, especially preferred is a compound having a positive birefringence of which the terminal is blocked with an alkyl group or an aromatic group. The terminal protection with a hydrophobic functional group is effective against aging at high temperature and high humidity, by which the hydrolysis of the ester group is retarded.

Preferably, the compound having a positive birefringence is protected with a monoalcohol residue or a monocarboxylic acid residue in order that both ends of the compound having a positive birefringence are not a carboxylic acid or a hydroxyl group. In this case, the monoalcohol residue is preferably a substituted or unsubstituted monoalcohol residue having from 1 to 30 carbon atoms, including, for example, aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol, oleyl alcohol; and substituted alcohols such as benzyl alcohol, 3-phenylpropanol.

Alcohol residues for terminal blocking that are preferred for use in the invention are methanol, ethanol, propanol, isopropanol, butanol, isobutanol, isopentanol, hexanol, isohexanol, cyclohexyl alcohol, isooctanol, 2-ethylhexyl alcohol, isononyl alcohol, oleyl alcohol, benzyl alcohol, more preferably methanol, ethanol, propanol, isobutanol, cyclohexyl alcohol, 2-ethylhexyl alcohol, isononyl alcohol and benzyl alcohol.

In blocking with a monocarboxylic acid residue, the monocarboxylic acid for use as the monocarboxylic acid residue is preferably a substituted or unsubstituted monocarboxylic acid having from 1 to 30 carbon atoms. It may be an aliphatic monocarboxylic acid or an aromatic monocarboxylic acid. Preferred aliphatic monocarboxylic acids are described. They include acetic acid, propionic acid, butanoic acid, caprylic acid, caproic acid, decanoic acid, dodecanoic acid, stearic acid, oleic acid. Preferred aromatic monocarboxylic acids are, for example, benzoic acid, p-tert-butylbenzoic acid, p-tert-amylbenzoic acid, orthotoluic acid, metatoluic acid, paratoluic acid, dimethylbenzoic acid, ethylbenzoic acid, normal-propylbenzoic acid, aminobenzoic acid, acetoxybenzoic acid. One or more of these may be used either singly or as combined.

The compound having a positive birefringence may be easily produced according to any of a thermal melt condensation method of polyesterification or interesterification of the above-mentioned dicarboxylic acid and diol and/or monocarboxylic acid or monoalcohol for terminal blocking, or according to an interfacial condensation method of an acid chloride of those acids and a glycol in an ordinary manner. The compounds having a positive birefringence are described in detail in Koichi Mural's "Additives, Their Theory and Application" (by Miyuki Publishing, first original edition published on Mar. 1, 1973). The materials described in JP-A 05-155809, 05-155810, 05-197073, 2006-259494, 07-330670, 2006-342227, 2007-003679 are also usable herein.

Specific examples of the compounds having a positive birefringence are shown below, to which, however, the compound having a positive birefringence for the invention should not be limited.

TABLE 1

| | Dicarboxylic acid | | | | Number |
| --- | --- | --- | --- | --- | --- |
| Aromatic dicarboxylic acid | Aliphatic dicarboxylic acid | Dicarboxylic acid ratio (Mol %) | Diol Aliphatic diol | Ends of polymer | average molecular weight |
| P-1 | — | AA | 100 | Ethandiol | Hydroxyl group | 1000 |
| P-2 | — | AA | 100 | Ethandiol | Hydroxyl group | 2000 |

TABLE 1-continued

| | Dicarboxylic acid | | | | | Number |
|---|---|---|---|---|---|---|
| | Aromatic dicarboxylic acid | Aliphatic dicarboxylic acid | Dicarboxylic acid ratio (Mol %) | Diol Aliphatic diol | Ends of polymer | average molecular weight |
| P-3 | — | AA | 100 | Propandiol | Hydroxyl group | 2000 |
| P-4 | — | AA | 100 | Butandiol | Hydroxyl group | 2000 |
| P-5 | — | AA | 100 | Hexandiol | Hydroxyl group | 2000 |
| P-6 | — | AA/SA | 60/40 | Ethandiol | Hydroxyl group | 900 |
| P-7 | — | AA/SA | 60/40 | Ethandiol | Hydroxyl group | 1500 |
| P-8 | — | AA/SA | 60/40 | Ethandiol | Hydroxyl group | 1800 |
| P-9 | — | SA | 100 | Ethandiol | Hydroxyl group | 1500 |
| P-10 | — | SA | 100 | Ethandiol | Hydroxyl group | 2300 |
| P-11 | — | SA | 100 | Ethandiol | Hydroxyl group | 6000 |
| P-12 | — | SA | 100 | Ethandiol | Hydroxyl group | 1000 |
| P-13 | PA | SA | 50/50 | Ethandiol | Hydroxyl group | 1000 |
| P-14 | PA | SA | 50/50 | Ethandiol | Hydroxyl group | 1800 |
| P-15 | PA | AA | 50/50 | Ethandiol | Hydroxyl group | 2300 |
| P-16 | PA | SA/AA | 40/30/30 | Ethandiol | Hydroxyl group | 1000 |
| P-17 | PA | SA/AA | 50/20/30 | Ethandiol | Hydroxyl group | 1500 |
| P-18 | PA | SA/AA | 50/30/20 | Ethandiol | Hydroxyl group | 2600 |
| P-19 | TPA | SA | 50/50 | Ethandiol | Hydroxyl group | 1000 |
| P-20 | TPA | SA | 50/50 | Ethandiol | Hydroxyl group | 1200 |
| P-21 | TPA | AA | 50/50 | Ethandiol | Hydroxyl group | 2100 |
| P-22 | TPA | SA/AA | 40/30/30 | Ethandiol | Hydroxyl group | 1000 |
| P-23 | TPA | SA/AA | 50/20/30 | Ethandiol | Hydroxyl group | 1500 |
| P-24 | TPA | SA/AA | 50/30/20 | Ethandiol | Hydroxyl group | 2100 |
| P-25 | PA/TPA | AA | 15/35/50 | Ethandiol | Hydroxyl group | 1000 |
| P-26 | PA/TPA | AA | 20/30/50 | Ethandiol | Hydroxyl group | 1000 |
| P-27 | PA/TPA | SA/AA | 15/35/20/30 | Ethandiol | Hydroxyl group | 1000 |
| P-28 | PA/TPA | SA/AA | 20/30/20/30 | Ethandiol | Hydroxyl group | 1000 |
| P-29 | PA/TPA | SA/AA | 10/50/30/10 | Ethandiol | Hydroxyl group | 1000 |
| P-30 | PA/TPA | SA/AA | 5/45/30/20 | Ethandiol | Hydroxyl group | 1000 |
| P-31 | — | AA | 100 | Ethandiol | Acetyl ester residue | 1000 |
| P-32 | — | AA | 100 | Ethandiol | Acetyl ester residue | 2000 |
| P-33 | — | AA | 100 | Propandiol | Acetyl ester residue | 2000 |
| P-34 | — | AA | 100 | Butandiol | Acetyl ester residue | 2000 |
| P-35 | — | AA | 100 | Hexandioll | Acetyl ester residue | 2000 |
| P-36 | — | AA/SA | 60/40 | Ethandiol | Acetyl ester residue | 900 |

TABLE 2

| | Dicarboxylic acid | | | | | Number |
|---|---|---|---|---|---|---|
| | Aromatic dicarboxylic acid | Aliphatic dicarboxylic acid | Dicarboxylic acid ratio (Mol %) | Diol Aliphatic diol | Ends of polymer | average molecular weight |
| P-37 | — | AA/SA | 60/40 | Ethandiol | Acetyl ester residue | 1000 |
| P-38 | — | AA/SA | 60/40 | Ethandiol | Acetyl ester residue | 2000 |
| P-39 | — | SA | 100 | Ethandiol | Acetyl ester residue | 1000 |
| P-40 | — | SA | 100 | Ethandiol | Acetyl ester residue | 3000 |
| P-41 | — | SA | 100 | Ethandiol | Acetyl ester residue | 5500 |
| P-42 | — | SA | 100 | Ethandiol | Acetyl ester residue | 1000 |
| P-43 | PA | SA | 50/50 | Ethandiol | Acetyl ester residue | 1000 |
| P-44 | PA | SA | 50/50 | Ethandiol | Acetyl ester residue | 1500 |
| P-45 | PA | AA | 50/50 | Ethandiol | Acetyl ester residue | 2000 |
| P-46 | PA | SA/AA | 40/30/30 | Ethandiol | Acetyl ester residue | 1000 |
| P-47 | PA | SA/AA | 33/33/34 | Ethandiol | Benzoic acid | 1000 |
| P-48 | PA | SA/AA | 50/20/30 | Ethandiol | Acetyl ester residue | 1500 |
| P-49 | PA | SA/AA | 50/30/20 | Ethandiol | Acetyl ester residue | 2000 |
| P-50 | TPA | SA | 50/50 | Ethandiol | Acetyl ester residue | 1000 |
| P-51 | TPA | SA | 50/50 | Ethandiol | Acetyl ester residue | 1500 |
| P-52 | TPA | SA | 45/55 | Ethandiol | Acetyl ester residue | 1000 |
| P-53 | TPA | AA | 50/50 | Ethandiol | Acetyl ester residue | 2200 |
| P-54 | TPA | SA | 35/65 | Ethandiol | Acetyl ester residue | 1000 |
| P-55 | TPA | SA/AA | 40/30/30 | Ethandiol | Acetyl ester residue | 1000 |
| P-56 | TPA | SA/AA | 50/20/30 | Ethandiol | Acetyl ester residue | 1500 |
| P-57 | TPA | SA/AA | 50/30/20 | Ethandiol | Acetyl ester residue | 2000 |
| P-58 | TPA | SA/AA | 20/20/60 | Ethandiol | Acetyl ester residue | 1000 |
| P-59 | PA/TPA | AA | 15/35/50 | Ethandiol | Acetyl ester residue | 1000 |
| P-60 | PA/TPA | AA | 25/25/50 | Ethandiol | Acetyl ester residue | 1000 |
| P-61 | PA/TPA | SA/AA | 15/35/20/30 | Ethandiol | Acetyl ester residue | 1000 |
| P-62 | PA/TPA | SA/AA | 20/30/20/30 | Ethandiol | Acetyl ester residue | 1000 |
| P-63 | PA/TPA | SA/AA | 10/50/30/10 | Ethandiol | Acetyl ester residue | 1000 |

TABLE 2-continued

| | Dicarboxylic acid | | | | | Number |
|---|---|---|---|---|---|---|
| | Aromatic dicarboxylic acid | Aliphatic dicarboxylic acid | Dicarboxylic acid ratio (Mol %) | Diol Aliphatic diol | Ends of polymer | average molecular weight |
| P-64 | PA/TPA | SA/AA | 5/45/30/20 | Ethandiol | Acetyl ester residue | 1000 |
| P-65 | PA/TPA | SA/AA | 5/45/20/30 | Ethandiol | Acetyl ester residue | 1000 |
| P-66 | IPA | AA/SA | 20/40/40 | Ethandiol | Acetyl ester residue | 1000 |
| P-67 | 2,6-NPA | AA/SA | 20/40/40 | Ethandiol | Acetyl ester residue | 1200 |
| P-68 | 1,5-NPA | AA/SA | 20/40/40 | Ethandiol | Acetyl ester residue | 1200 |
| P-69 | 1,4-NPA | AA/SA | 20/40/40 | Ethandiol | Acetyl ester residue | 1200 |
| P-70 | 1,8-NPA | AA/SA | 20/40/40 | Ethandiol | Acetyl ester residue | 1200 |
| P-71 | 2,8-NPA | AA/SA | 20/40/40 | Ethandiol | Acetyl ester residue | 1200 |

In Table 1 and Table 2, PA is phthalic acid, TPA is terephthalic acid, IPA is isophthalic acid, AA is adipic acid, SA is succinic acid, 2,6-NPA is 2,6-naphthalenedicarboxylic acid, 2,8-NPA is 2,8-naphthalenedicarboxylic acid, 1,5-NPA is 1,5-naphthalenedicarboxylic acid, 1,4-NPA is 1,4-naphthalenedicarboxylic acid, 1,8-NPA is 1,8-naphthalenedicarboxylic acid.

The compound having a positive birefringence is added in an amount of preferably from 1 to 30 parts by mass relative to 100 parts by mass of the cellulose resin, more preferably from 4 to 25 parts by mass relative to 100 parts by mass of the cellulose resin, still more preferably from 10 to 20 parts by mass relative to 100 parts by mass of the cellulose resin. The above-mentioned, positive birefringent compound has a large molecular weight, and therefore, under an ordinary condition, the hydroxyl-terminated, positive birefringent compound does not almost act for ring opening of the styrene/maleic anhydride copolymer. In particular, in case where the partially ring-opened, styrene/maleic anhydride copolymer must be prepared using the hydroxyl-terminated, positive birefringent compound, some known catalyst may be added to the system to prepare the intended partially ring-opened copolymer.

<Other Additives>

The cellulose acylate film of the invention may contain any other additives, in addition to the above-mentioned the partially ring-opened, styrene/maleic anhydride and retardation enhancer. These other additives include antioxidation agent, UV absorbent, release promoter, plasticizer, etc. and known additives are used for each.

(Plasticizer)

For improving the mechanical properties of the film of the invention or for increasing the drying speed thereof, a plasticizer may be added to the cellulose acylate solution. As the plasticizer for use in the invention, for example, compounds described in JP-A 2008-181105 [0067] may be exemplified.

(Organic Solvent)

As the organic solvents of the cellulose acylate solution in the invention, organic solvents are preferably selected from ethers having 3-12 carbon atoms, esters having 3-12 carbon atoms, ketones having 3-12 carbon atoms and halogenated hydrocarbons having 1-6 carbon atoms. The ethers, the ketones and the esters may have a cyclic structure. Compounds having two or more functional groups of ethers, esters and ketones (i.e., —O—, —CO— and —COO—) are also usable herein as the organic solvent; and they may have any other functional group such as an alcoholic hydroxyl group. In case where the organic solvent has two or more functional groups, the number of the carbon atoms constituting the organic solvent may fall within a range of the number of carbon atoms that constitute the compound having any of those functional groups.

Examples of the ethers having 3-12 carbon atoms are diisopropyl ether, dimethoxymethane, dimethoxyethane, 1,4-dioxane, 1,3-dioxolane, tetrahydrofuran, anisole and phenetole.

Examples of the ketones having 3-12 carbon atoms are acetone, methyl ethyl ketone, diethyl ketone, diisobutyl ketone, cyclohexanone and methylcyclohexanone.

Examples of the esters having 3-12 carbon atoms are ethyl formate, propyl formate, pentyl formate, methyl acetate, ethyl acetate and pentyl acetate.

Examples of the organic solvents having plural functional groups are 2-ethoxyethyl acetate, 2-methoxyethanol and 2-butoxyethanol.

The number of the carbon atoms constituting the halogenohydrocarbon is preferably 1 or 2, most preferably 1. The halogen in the halogenohydrocarbon is preferably chlorine. The proportion of the hydrogen atoms in the halogenohydrocarbon substituted with a halogen is preferably from 25 to 75 mol %, more preferably from 30 to 70 mol %, even more preferably from 35 to 65 mol %, most preferably from 40 to 60 mol %. Methylene chloride is a typical halogenohydrocarbon.

Two or more different types of organic solvents may be mixed for use in the invention.

(Method for Preparing Cellulose Acylate Solution)

The cellulose acylate solution may be prepared according to an ordinary method. In one general method, the solution is processed at a temperature not lower than 0° C. (room temperature or high temperature). For preparing the solution, employable is a method and an apparatus for dope preparation according to an ordinary solvent casting method. In the ordinary method, preferably used is a halogenohydrocarbon (especially methylene chloride) as the organic solvent.

The amount of the cellulose acylate is so controlled that it may be in the solution in an amount of from 10 to 40% by mass. The amount of the cellulose acylate is preferably from 10 to 30% by mass.

The solution is prepared by stirring a cellulose acylate and an organic solvent at room temperature (0 to 40° C.). A high-concentration solution may be stirred under pressure and under heat. Concretely, a cellulose acylate and an organic solvent are put into a pressure chamber, then closed and stirred therein and under heat at a temperature within a range between the boiling point of the solvent at room temperature and the boiling point under the pressure. The heating temperature is generally 40° C. or higher, preferably from 60 to 200° C., more preferably from 80 to 110° C.

The ingredients may be put into the chamber after roughly premixed. They may be put into the chamber one after another. The chamber must be so planned that the contents therein could be stirred. An inert gas such as nitrogen gas or the like may be introduced into the chamber to pressurize it. The solvent may be heated, and vapor pressure of it may be utilized to pressurize the chamber. Alternatively, after the chamber is closed, the ingredients may be introduced thereinto under pressure.

Preferably, the contents in the chamber are heated in an external heating mode. For example, a jacket type heating unit may be used. A plate heater may be disposed outside the chamber, and a liquid may be circulated through the pipeline disposed in the heater to thereby heat the entire chamber.

Also preferably, a stirring blade may be disposed inside the chamber, with which the contents may be stirred. The stirring blade preferably has a length that reaches near the wall of the chamber. At the tip of the stirring blade, a scraper is preferably provided for renewing the liquid film formed on the wall of the chamber.

The chamber may be equipped with various meters such as a pressure gauge, a thermometer, etc. In the chamber, the ingredients are dissolved in the solvent. Thus prepared, the dope is taken out of the chamber after cooled, or after taken out of it, the dope may be cooled with a heat exchanger or the like.

The solution may also be prepared according to a cooling dissolution method. According to the cooling dissolution method, a cellulose acylate may be dissolved even in an organic solvent in which it can be hardly dissolved in an ordinary dissolution method. For the solvent in which a cellulose acylate can be dissolved in an ordinary dissolution method, the cooling dissolution method is advantageous in that a uniform solution can be prepared rapidly.

In the cooling dissolution method, first, a cellulose acylate is gradually added to an organic solvent at room temperature with stirring. The amount of the cellulose acylate is so controlled that the resulting mixture can contain it in an amount of from 10 to 40% by mass. The amount of the cellulose ester is more preferably from 10 to 30% by mass. Further, any desired additives to be mentioned below may be added to the mixture.

Next, the mixture is cooled to −100 to −10° C. (preferably −80 to −10° C., more preferably −50 to −20° C., most preferably −50 to −30° C.). The cooling may be attained, for example, in a dry ice/methanol bath (−75° C.) or in a cooled diethylene glycol solution (−30 to −20° C.). Thus cooled, the mixture of cellulose acylate and organic solvent is solidified.

The cooling speed is preferably at least 4° C./min, more preferably at least 8° C./min, most preferably at least 12° C./min. The cooling speed is preferably higher, but its theoretical uppermost limit is 10000° C./sec, the technical uppermost limit is 1000° C./sec, and the practicable uppermost limit is 100° C./sec. The cooling speed is a value computed by dividing the difference between the temperature at the start of the cooling and the final cooling temperature by the time taken from the start of the cooling to the arrival to the final cooling temperature.

Further, this is heated at 0 to 200° C. (preferably 0 to 150° C., more preferably 0 to 120° C., most preferably 0 to 50° C.), and the cellulose acylate is thereby dissolved in the organic solvent. For the heating, the solid may be left at room temperature, or may be heated in a hot bath. The heating speed is preferably at least 4° C./min, more preferably at least 8° C./rain, most preferably at least 12° C./min. The heating speed is preferably higher; but its theoretical uppermost limit is 10000° C./sec, the technical uppermost limit is 1000° C./sec, and the practicable uppermost limit is 100° C./sec. The heating speed is a value computed by dividing the difference between the temperature at the start of the heating and the final heating temperature by the time taken from the start of the heating to the arrival to the final heating temperature.

As in the above, a uniform solution can be obtained. When the dissolution is insufficient, then the cooling and heating operation may be repeated. As to whether or not the dissolution is satisfactory may be determined merely by visually observing the outward appearance of the solution.

In the cooling dissolution method, preferably used is a closed container for the purpose of preventing the mixture from being contaminated with water from the dew formed in cooling. In the cooling and heating operation, preferably, the chamber is made under pressure in cooling and is made under reduced pressure in heating, to thereby shorten the dissolution time. For pressurizing and depressurizing the chamber, preferably used is a pressure chamber.

A 20% by mass solution prepared by dissolving a cellulose acylate (having a degree of total acetyl substitution of 60.9%, and having a viscosity-average degree of polymerization of 299) in methyl acetate according to the cooling dissolution method has a pseudo-phase transition point between a sol state and a gel state at around 33° C., when analyzed through differential scanning calorimetry (DSC), and at a temperature lower than the point, the solution is in the form of a uniform gel. Accordingly, the solution must be stored at a temperature not lower than the pseudo-phase transition temperature, preferably at around a temperature of the gel-phase transition temperature plus 10° C. or so. However, the pseudo-phase transition temperature differs, depending on the degree of total acetyl substitution and the viscosity-average degree of polymerization of the cellulose acylate and on the solution concentration and the organic solvent used.

In the production method of the invention, the partially ring-opened, styrene/maleic anhydride copolymer and other optional additives may be added to the organic solvent (main solvent) along with the cellulose acylate resin thereto; however, it is desirable that the ingredient capable of ring-opening the styrene/maleic anhydride copolymer (e.g., alcohols, especially methanol) is not kept existing in the cellulose acylate solution for a long period of time. Specifically, in the production method of the invention, preferably, a cellulose acylate resin and other additives than the partially ring-opened, styrene/maleic anhydride copolymer alone are previously added to an organic solvent (main solvent) to prepare a cellulose acylate solution (cellulose acylate dope), and thereafter the partially ring-opened, styrene/maleic anhydride copolymer is added thereto just before the subsequent casting step to be mentioned below thereby to prepare the cellulose acylate solution to be used in the casting step. This embodiment is preferred from the viewpoint of highly controlling the degree of ring opening of the partially ring-opened, styrene/maleic anhydride copolymer.

Preferably, in the production method of the invention, the step of bringing the styrene/maleic anhydride copolymer into contact with the ingredient capable of ring-opening the ring-closed acid anhydride structure moiety in the styrene/maleic anhydride copolymer is followed by a step of mixing the resulting, partially ring-opened, styrene/maleic anhydride copolymer with a cellulose acylate resin. This embodiment is preferred, because in this, the degree of ring opening of the partially ring-opened, styrene/maleic anhydride copolymer can be controlled highly before the copolymer is added to the cellulose acylate solution.

From the thus-prepared cellulose acylate solution (dope), a cellulose acylate film can be produced according to a solvent casting method. A film having improved wet heat durability and low haze can be produced by casting a solution containing a styrene/maleic anhydride copolymer in a partially ring-opened form according to the method for producing the cellulose acylate film of the invention.

The dope is cast on a drum or a band, on which the solvent is evaporated away to form a film. Before cast, the concentration of the dope is preferably so planned that the solid content thereof is from 18 to 35% by mass. Preferably, the surface of the drum or the band is finished to be a mirror face. The casting and drying method in solvent casting is described in U.S. Pat. No. 2,336,310, 2,367,603, 2,492,078, 2,492,977, 2,492,978, 2,607,704, 2,739,069, 2,739,070, British Patents 640731, 736892, JP-B 45-4554, 49-5614, JP-A 60-176834, 60-203430, 62-115035.

Preferably, the dope is cast on a drum or a band at a surface temperature of not higher than 10° C. After thus cast, preferably, the dope is dried by exposing to the wind for at least 2 seconds. The formed film is peeled away from the drum or the band, and then it may be dried with the high-temperature wind of which the temperature is stepwise changed from 100° C. to 160° C. to thereby remove the residual solvent by vaporization. This method is described in JP-B 5-17844. According to the method, the time to be taken from the casting to the peeling may be shortened. In carrying out the method, the dope must be gelled at the surface temperature of the drum or the band on which it is cast.

(Co-Casting)

In the invention, the prepared cellulose acylate solution may be cast onto a smooth band or drum serving as a metal support, as a single-layer solution; or plural cellulose acylate solutions for 2 or more layers may be co-cast thereon. In case where plural cellulose acylate solutions are co-cast, the cellulose acylate-containing solution may be cast onto a metal support through plural casting mouths disposed around the support at intervals in the machine direction, and the co-cast solutions may be laminated on the support to give a film. For example, the methods described in JP-A 61-158414, 1-122419, 11-198285 are employable. The cellulose acylate solution may be cast through two casting mouths to form a film, for which, for example, employable are the methods described in JP-B 60-27562, JP-A 61-94724, 61-947245, 61-104813, 61-158413, 6-134933. Also employable herein is a cellulose acylate film co-casting method of casting a flow of a high-viscosity cellulose acylate solution as enveloped with a low-viscosity cellulose acylate solution thereby simultaneously extruding both the high-viscosity and low-viscosity cellulose acylate solutions, as in JP-A 56-162617. Also preferred is an embodiment where the outer solution contains a larger amount of a poor solvent, alcohol than in the inner solution, as in JP-A 61-94724, 61-94725.

Two casting mouths may be used as follows: A film is formed on a metal support through the first casting mouth, then this is peeled, and on the other surface of the film opposite to that having kept in contact with the metal support, another film is formed through the second casting mouth. For example, the method is described in JP-B 44-20235. The cellulose acylate solutions to be cast may be the same or different with no specific limitation. In order to make the plural cellulose acylate layers have various functions, cellulose acylate solutions corresponding to the desired functions may be cast through the respective casting mouths. The cellulose acylate solution of the invention may be cast along with any other functional layers (e.g., adhesive layer, dye layer, antistatic layer, antihalation layer, UV absorbent layer, polarizing layer).

In case where a single-layer film is formed according to a conventional technique, a high-concentration and high-viscosity cellulose acylate solution must be extruded out in order to make the formed film have a desired thickness; but in such a case, the stability of the cellulose acylate solution is poor therefore causing various problems of solid deposition to be fish eyes or to roughen the surface of the film. For solving the problems, plural cellulose acylate solutions are cast out through different casting mouths, whereby high-density solutions can be extruded out at the same time on a metal support, and as a result, the surface properties of the formed films are bettered and films having excellent surface properties can be produced. In addition, since such thick cellulose acylate solutions can be used and the drying load in the process can be reduced, and the film producibility is enhanced.

In co-casting, the thickness of the outer layer and the inner layer is not specifically defined. Preferably, the thickness of the outer layer is from 1 to 50% of the overall thickness of the film, more preferably from 2 to 30%. In co-casting of three or more layers, the total thickness of the layer adjacent to the metal support and the outermost layer adjacent to air is defined to be the thickness of the outer layer.

In another embodiment of co-casting, cellulose acylate solutions in which the density of the additives such as the above-mentioned plasticizer, UV absorbent, mat agent and the like differs may be co-cast to produce a cellulose acylate film having a laminate structure. For example, a cellulose acylate film having a constitution of skin layer/core layer/skin layer can be produced. For example, the mat agent may be much in the skin layer, or may be only in the skin layer. The plasticizer and the UV absorbent may be more in the core layer than in the skin layer, or may be only in the core layer. The type of the plasticizer and the UV absorbent may differ between the core layer and the skin layer. For example, a low-volatile plasticizer and/or UV absorbent may be in the skin layer, and a plasticizer of excellent plasticization or a UV absorbent of excellent UV absorption may be added to the core layer. An embodiment of adding a release agent to only the skin layer on the side of the metal support is also preferred. In order to gel the solution by cooling the metal support in a cooling drum method, alcohol as a poor solvent may be more in the skin layer than in the core layer, and this is also a preferred embodiment. Tg may differ between the skin layer and the core layer. Preferably, Tg of the core layer is lower than that of the skin layer. The viscosity of the cellulose ester solution to be cast may differ between the skin layer and the core layer. Preferably, the viscosity of the solution for the skin layer is smaller than that for the core layer; however, the viscosity of the solution for the core layer may be smaller than that for the skin layer.

A method of drying the web that is dried on a drum or belt and is peeled away from it is described. The web peeled away at the peeling position just before one lap of the drum or the belt is conveyed according to a method where the web is led to pass alternately through rolls disposed like a houndstooth check, or according to a method where the peeled web is conveyed in a non-contact mode while both sides of the web are held by clips or the like. The drying may be attained according to a method where the wind at a predetermined temperature is given to both surfaces of the web (film) being conveyed, or according to a method of using a heating means such as microwaves, etc. Rapid drying may damage the surface smoothness of the formed film. Therefore, in the initial stage of drying, the web is dried at a temperature at which the solvent does not bubble, and after having gone on in some degree, the drying may be preferably attained at a high temperature. In the drying step after peeled away from the support, the film tends to shrink in the machine direction or in the cross direction owing to solvent evaporation. The shrinkage may be larger in drying at a higher temperature. Preferably, the shrinkage is inhibited as much as possible for bettering the surface condition of the film to be formed. From this viewpoint, for example, preferred is a method (tenter method) where the entire drying step or a part of the drying step is carried out with both sides of the web held with clips or pins so as to keep the width of the web, as in JP-A 62-46625. The drying temperature in the drying step is preferably from 100 to 145° C. The drying temperature, the drying wind speed and the drying time may vary depending on the solvent used, and are therefore suitably selected in accordance with the type and the combination of the solvent to be used. In producing the film of the invention, the web (film) peeled away from the support is stretched preferably when the residual solvent amount in the web is less than 120% by mass.

The residual solvent amount may be represented by the following formula:

Residual Solvent Amount (% by mass)={(M–N)/N}×100 wherein M means the mass of the web at an undefined point, and N means the mass of the web having the mass M, dried at 110° C. for 3 hours. When the residual solvent amount in the web is too much, then the web could not receive the effect of its stretching; but when too small, stretching the web is extremely difficult, and the web may be broken. More preferably, the residual solvent amount in the web is from 10 to 50% by mass, even more preferably from 12 to 35% by mass. In case where the draw ratio in stretching is too small, the film could not have a sufficient retardation; but when too large, the film would be difficult to be stretched and would be broken.

In the invention, the film produced according to a solution casting method and having a residual solvent amount falling within a specific range can be stretched, not heated at a high temperature; however, preferably, the film is stretched while dried, as the processing process may be shortened. However, when the temperature of the web is too high, then the plasticizer may evaporate away, and therefore, the temperature range is preferably from room temperature (15° C.) to 145° C. A method of stretching the film in two directions perpendicular to each other is effective for controlling the film refractivity, Nx, Ny and Nz to fall within the range of the invention. For example, when the film is stretched in the casting direction and when the shrinkage in the cross direction is too large, then the value Nz may increase too much. In this case, the problem may be solved by reducing the cross shrinkage of the film or by stretching the film in the cross direction. In case where the film is stretched in the cross direction, the film may have a refractivity distribution in the cross direction. This often occurs, for example, when a tenter method is employed for film stretching. This is a phenomenon to be caused by the generation of the shrinking force in the center part of the film while the edges of the film are kept fixed, and this may be considered as a so-called bowing phenomenon. Also in this case, the bowing phenomenon can be prevented by stretching the film in the casting direction, whereby the retardation distribution in the cross direction can be reduced. Further, by stretching the film in two directions perpendicular to each other, the film thickness fluctuation may be reduced. When the film thickness fluctuation of a cellulose acylate film is too large, then the distribution fluctuation thereof may also be large. The film thickness fluctuation of the cellulose acylate film is preferably within a range of ±3%, more preferably within a range of ±1%. For the above-mentioned objects, the method of stretching the film in two directions perpendicular to each other is effective, and the draw ratio in stretching in two directions perpendicular to each other is preferably from 1.2 to 2.0 times in one direction and from 0.7 to 1.0 time in the other direction. The mode of stretching the film by from 1.2 to 2.0 times in one direction and by from 0.7 to 1.0 time in the other direction means that the distance between the clips or the pins supporting the film is made to be from 0.7 to 1.0 times the distance therebetween before the stretching.

In general, in case where the film is stretched in the cross direction by 1.2 to 2.0 times, using a biaxial stretching tenter, a shrinking force acts on the perpendicular direction thereof, or that is, on the machine direction of the film.

Accordingly, when the film is stretched while a force is kept applied only in one direction, then the width of the film in the other direction perpendicular to that one direction may shrink. The method means that the shrinking degree is controlled without control of the width of the film, or that is, this means that the distance between the clips or the pins for width control is defined to be from 0.7 to 1.0 time the distance therebetween before stretching. In this case, a force of shrinking the film in the machine direction acts on the film owing to the stretching in the cross direction. The distance kept between the clips or the pins in the machine direction makes it possible to prevent any unnecessary tension from being given to the film in the machine direction thereof. The method of stretching the web is not specifically defined. For example, there are mentioned a method of providing plural rolls each running at a different peripheral speed and stretching the film in the machine direction based on the peripheral speed difference between the rolls, a method of holding both sides of the web with clips or pins and expanding the distance between the clips or pins in the machine direction to thereby stretch the film in the machine direction, or expanding the distance therebetween in the cross direction to thereby stretch the film in the cross direction, and a method of expanding the distance both in the machine direction and in the cross direction to thereby stretch film in both the machine and cross directions. Needless-to-say, these methods may be combined. In the so-called tenter method, preferably, the clip parts are driven according to a linear driving system, by which the film may be smoothly stretched with little risk of breaking, etc.

[Cellulose Acylate Film]

The cellulose acylate film of the invention is characterized by being produced by casting a solution containing a cellulose acylate and the partially ring-opened, styrene/maleic anhydride.

The cellulose acylate film may be a single-layered film or a multilayered film. For example, in case where the cellulose acylate film of the invention is produced through co-casting, it may have at least two layers of a core layer and a skin layer. In this case, the polymer X may be in any of the core layer or the skin layer, but is preferably in the core layer.

(Haze)

The cellulose acylate film of the invention preferably has a haze of less than 1%, more preferably less than 0.5%. Having a haze of less than 1%, the transparency of the cellulose acylate film is enough high to use as a cellulose acylate film.

(Retardation (Re and Rth))

The preferred range of the retardation of the cellulose acylate film changes depending on the use thereof. Re and Rth of the cellulose acylate film of the invention are preferably 30 nm<Re<100 nm and 80 nm<Rth<300 nm. More preferably, Re and Rth of the film are 30 nm<Re<80 nm and 80 nm<Rth<200 nm, particularly preferably 30 nm<Re<70 nm and 80 nm<Rth<150 nm.

Re($\lambda$) and Rth($\lambda$) represent, herein, the retardation in the plane and the retardation in the thickness direction, respectively, at a wavelength of $\lambda$. Re($\lambda$) is measured with KOBRA 21ADH or WR (by Oji Scientific Instruments) while allowing light having the wavelength of $\lambda$ nm to enter in the normal direction of a film. With the in-plane slow axis (determined by KOBRA 21ADH or WR) taken as the inclination axis (rotation axis) of the sample (in case where the sample has no slow axis, the rotation axis of the sample may be in any in-plane direction of the sample), Re(λ) of the sample is measured at 6 points in all thereof, up to +50° relative to the normal line direction of the sample at intervals of 10°, by applying a light having a wavelength of λ nm from the inclined direction of the sample. With the slow axis taken as the inclination axis (rotation axis) (in case where the sample has no slow axis, the rotation axis of the sample may be in any in-plane direction of the film), the retardation values of the sample are measured in any inclined two directions; and based on the data and the mean refractive index and the inputted thickness of the sample, Rth may be calculated according to the following formulae (11) and (12). The mean refractive index may be used values described in catalogs for various types of optical films. When the mean refractive index has not known, it may be measured with Abbe refractometer. The mean refractive index for major optical film is described below: cellulose acylate (1.48), cycloolefin polymer (1.52), polycarbonate (1.59), polymethylmethacrylate (1.49) and polystyrene (1.59). By inputting the value of these average refraction indices and thickness, KOBRA 21ADH or WR computes nx, ny, nz. From the computed nx, ny, nz, Nz=(nx−nz)/(nx−ny) is computed further.

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad (11)$$

The above Re(θ) represents the retardation in a direction that inclines in the degree of θ from the normal direction; and d is a thickness of the film.

$$Rth = \{(nx+ny)/2 - nz\} \times d \quad (12)$$

In this, the mean refractive index n is needed as a parameter, and it is measured with an Abbe refractometer (Atago's Abbe Refractometer 2-T).

(Wet Heat Durability)

When stored for a long period of time under high-temperature high-humidity condition, the optical properties of the cellulose acylate film of the invention change little. To that effect, the wet heat durability of the optical properties of the film of the invention is improved, and therefore the film can exhibit a high retardation for a long period of time under high-temperature high-humidity condition. Accordingly, the cellulose acylate film of the invention is favorable for use in high-temperature high-humidity condition.

Preferably, the retardation in the plane of the cellulose acylate film of the invention, Re, changes by from −10% to 10% after the cellulose acylate film is kept at 60° C. and relative humidity 90% for 150 hours (hereinafter this difference per original Re of the cellulose acylate film of the invention just after its production may be referred to as "ΔRe"), more preferably changes by from −8% to 8%, even more preferably changes by from −5% to 5%.

Preferably, the retardation in the thickness direction of the cellulose acylate film, Rth, changes by from −10% to 10% after the cellulose acylate film is kept at 60° C. and relative humidity 90% for 150 hours (hereinafter this difference per original Rth of the cellulose acylate film of the invention just after its production may be referred to as "ΔRth"), more preferably changes by from −8% to 8%, even more preferably changes by from −5% to 5%.

(Film Thickness)

Preferably, the thickness of the cellulose acylate film of the invention is from 20 to 80 μm, more preferably from 30 to 60 μm. Having a thickness of at least 20 μm the film is favorable since the handleability thereof in producing a web-like film is good. Having a thickness of at most 80 μm, the film is also favorable since it readily answers to the ambient moisture change and may readily maintain its optical properties.

[Polarizer]

The polarizer of the invention comprises a polarizing element and the cellulose acylate film of the invention. Typically, the polarizer comprises the cellulose acylate film of the invention as a protective film for the polarizing element. A polarizer comprises a polarizing element and a transparent protective film disposed on at least one side of the element, in general two transparent protective films disposed on both sides of the element. In the invention, at least one protective film of the polarizer is formed of the cellulose acylate film of the invention. The other protective film may be the cellulose acylate film of the invention or may be any other ordinary cellulose acetate film or the like.

As mentioned above, a polarizer is constructed by laminating a polarizer-protective film on at least one surface of a polarizing element. The polarizing element may be any conventional one. For example, this is prepared by processing a hydrophilic polymer film such as a polyvinyl alcohol film with a dichroic dye such as iodine. Not specifically defined, the cellulose acylate film may be stuck to the polarizing element in any desired manner, for which, for example, an adhesive of an aqueous solution of a water-soluble polymer may be used. Preferably, the water-soluble polymer adhesive is an aqueous solution of completely-saponified polyvinyl alcohol.

The polarizer may have a retardation film provided on the protective film. Preferably, the retardation film is stuck with an adhesive. As the adhesive, for example, employable are those described in JP-A 2000-109771, 2003-34781.

Preferred embodiments of the constitution of the polarizer of the invention include a constitution of protective film/polarizing element/protective film/liquid crystal cell/cellulose acylate film of the invention/polarizing element/polarizer-protective film; or a constitution of polarizer-protective film/polarizing element/cellulose acylate film of the invention/liquid crystal cell/cellulose acylate film of the invention/polarizing element/polarizer-protective film. In particular, the polarizer of the invention is favorably stuck to a TN-mode, VA-mode or OCB-mode liquid crystal cell, thereby constructing liquid crystal displays excellent in viewing angle and visibility with little coloration. In particular, the polarizer comprising the cellulose acylate film of the invention is excellent in the humidity stability under humidity changing condition and in the long-term wet heat durability under high-temperature high-humidity condition, and therefore can maintain stable performance for a long period of time under high-temperature high-humidity condition. Excellently, in addition, the haze of the polarizer of the invention is low.

[Liquid Crystal Display Device]

The cellulose acylate film and the polarizer having the film of the invention are usable in liquid crystal cells and liquid crystal display devices of various display modes. For these, proposed are various modes of TN (twisted nematic), IPS (in-plane switching), FLC (ferroelectric liquid crystal), AFLC (anti-ferroelectric liquid crystal), OCB (optically compensatory bend), STN (super twisted nematic), VA (vertically aligned) and HAN (hybrid aligned nematic) modes.

The OCB-mode liquid crystal cell is a bend-alignment mode liquid crystal cell, in which the rod-shaped liquid crystal molecules in the upper part of the liquid crystal cell and those in the lower part thereof are aligned in the direction substantially oppositely (symmetrically) to each other. The OCB-mode liquid crystal cell is disclosed in U.S. Pat. Nos. 4,583,825 and 5,410,422. Since the rod-shaped liquid crystal molecules are aligned symmetrically between the upper part and the lower part of the liquid crystal cell therein, the bend-alignment mode liquid crystal cell has a self-optically compensating function. The bend-alignment mode liquid crystal display device has the advantage of rapid response speed.

In the VA-mode liquid crystal cell, rod-shaped liquid crystal molecules are aligned substantially vertically under no voltage application.

The VA-mode liquid crystal cell includes, in addition to (1) the VA-mode liquid crystal cell of a narrow sense, where rod-shaped liquid crystal molecules are aligned substantially vertically under no voltage application and are aligned horizontally under voltage application (described in JP-A 2-176625), (2) a multidomained VA-mode (MVA-mode) liquid crystal cell with enlarged viewing angles (in SID 97, Digest of Tech. Papers (preprints) 28 (1997), 845), (3) a liquid crystal cell of an n-ASM mode in which the rod-shaped liquid crystal molecules are aligned substantially vertically under no voltage application and are aligned in twisted multi-domains under voltage application (in Sharp Technical Report, No. 80, p. 11), and (4) a liquid crystal cell of a SURVIVAL mode (in Monthly Journal of Display, May, p. 14 (1999)).

The VA-mode liquid crystal display device has a liquid crystal cell and two polarizers disposed on both sides thereof. The liquid crystal cell carries a liquid crystal between two electrode substrates. In one embodiment of a transmission-type liquid crystal display device of the invention, one film of the invention is disposed between the liquid crystal cell and one polarizer, or two films of the invention are between the liquid crystal cell and both polarizers.

In another embodiment of a transmission-type liquid crystal display device of the invention, an optically-compensatory sheet comprising the film of the invention is used as the transparent protective film of the polarizer to be disposed between the liquid crystal cell and the polarizing element. The optically-compensatory sheet may be used as only the protective film for one polarizer (between the liquid crystal cell and the polarizing element), or the optically-compensatory sheet may be used as the two protective films for both polarizers (between the liquid crystal cell and the polarizing element). In case where the optically-compensatory sheet is used only for one polarizer, preferably, the sheet serves as the protective film on the liquid crystal cell side of the backlight-side polarizer adjacent to the liquid crystal cell. When stuck to the liquid crystal cell, preferably, the film of the invention is on the VA-cell side. The protective film may be any ordinary cellulose film, and is preferably thinner than the film of the invention. For example, its thickness is preferably from 40 to 80 µm. Not limited thereto, the film includes commercial KC4UX2M (by Konica-Opto, 40 µm), KC5UX (by Konica-Opto, 60 µm), TD80 (by FUJIFILM Corporation, 80 µm), etc.

EXAMPLES

The characteristics of the invention are described more concretely with reference to the following Examples. In the following Examples, the material used, its amount and the ratio, the details of the treatment and the treatment process may be suitably modified or changed. Accordingly, the invention should not be limitatively interpreted by the Examples mentioned below.

Example 1

(Preparation of Solution Containing Partially Ring-Opened, Styrene/Maleic Anhydride Copolymer)

A commercially-available styrene/maleic anhydride copolymer having a ratio of St/MAn shown in Table 3 below and having a degree of ring opening of 0% was dissolved in a mixed solvent of an alcohol mentioned below and methylene chloride to prepare a partially ring-opened, styrene/maleic anhydride copolymer. The detailed conditions are shown in the following Table. In every case, the amount of the solvent combined with the alcohol was 78 g.

A partially ring-opened, styrene/maleic anhydride copolymer having a degree of ring opening of 20% was prepared by dissolving 22 g of the styrene/maleic anhydride copolymer in Table 3, SMA1000P in the above-mentioned solvent combined with 0.7 g methanol, and then stirring it at 25° C. for 60 minutes, and thereafter this was static for 2 days.

A partially ring-opened, styrene/maleic anhydride copolymer having a degree of ring opening of 50% was prepared by dissolving 22 g of the styrene/maleic anhydride copolymer in Table 3, SMA1000P in the above-mentioned solvent combined with 1.2 g methanol, or dissolving 22 g of the styrene/maleic anhydride copolymer in Table 3, SMA2000P in the above-mentioned solvent combined with 0.8 g methanol, and then stirring it at 25° C. for 60 minutes, and thereafter this was static for 2 days.

A partially ring-opened, styrene/maleic anhydride copolymer having a degree of ring opening of 80% was prepared by dissolving 22 g of the styrene/maleic anhydride copolymer in Table 3, SMA2000P in the above-mentioned solvent combined with 1.87 g methanol, or dissolving 22 g of the styrene/maleic anhydride copolymer in Table 3, SMA3000P in the above-mentioned solvent combined with 1.4 g methanol, and then stirring it at 25° C. for 60 minutes, and thereafter this was static for 2 days.

A partially ring-opened, styrene/maleic anhydride copolymer having a degree of ring opening of 90% was prepared by dissolving 22 g of the styrene/maleic anhydride copolymer in Table 3, SMA2000P in the above-mentioned solvent combined with 2.08 g methanol, or dissolving 22 g of the styrene/maleic anhydride copolymer in Table 3, SMA3000P in the above-mentioned solvent combined with 1.56 g methanol, and then stirring it at 25° C. for 60 minutes, and thereafter this was static for 2 days.

A partially ring-opened, styrene/maleic anhydride copolymer having a degree of ring opening of 100% was prepared by dissolving 22 g of the styrene/maleic anhydride copolymer in Table 3, SMA1000P in the above-mentioned solvent combined with 3.51 g methanol, or dissolving 22 g of the styrene/maleic anhydride copolymer in Table 3, SMA2000P in the above-mentioned solvent combined with 2.34 g methanol, or dissolving 22 g of the styrene/maleic anhydride copolymer in Table 3, SMA3000P in the above-mentioned solvent combined with 1.76 g methanol, and then stirring it at 25° C. for 60 minutes, and thereafter this was static for 2 days.

In the Example 22, styrene/maleic acid anhydrate described in the Table 3 below is dissolved in 1.1 g propanol in place of methanol. In the Example 23, styrene/maleic acid anhydrate described in the Table 3 below is dissolved in 1.4 g butanol in place of methanol.

TABLE 3

| Styrene/maleic anhydride copolymer (Open ring ratio 0%) | Styrene/Maleic Anhydride Composition ratio | Maker | Molecular weight |
|---|---|---|---|
| SMA1000P | 1/1 | Sartomer | 5500 |
| SMA2000P | 2/1 | Sartomer | 7500 |
| SMA3000P | 3/1 | Sartomer | 9500 |
| SMA EF40 | 4/1 | Sartomer | 10500 |

The degree of ring opening of the partially ring-opened, styrene/maleic anhydride copolymer prepared according to the above-mentioned method was confirmed according to the method mentioned below.

Degree of Ring Opening=$A$[partially ring-opened copolymer]/$A$[completely ring-closed copolymer]

where A means the absorbance at 1860 cm$^{-1}$ (in KBr method using an apparatus, Nicolet 6700 FT-IR (by Termo Electron Corporation).

In this, A[partially ring-opened copolymer] means the absorbance at the above-mentioned wavelength of the prepared, partially ring-opened, styrene/maleic anhydride copolymer, and A[completely ring-closed copolymer] means the absorbance of the starting styrene/maleic anhydride copolymer.

The solution containing the partially ring-opened, styrene/maleic anhydride copolymer prepared in the manner as above and a cellulose acylate dope a mentioned below were used to form a film according to a solution casting method mentioned below. The partially ring-opened, styrene/maleic anhydride copolymer was mixed with the cellulose acylate resin just before casting.

(Cellulose Acylate Dope a)
Cellulose acylate resin: having a degree of substitution shown in Table 5 below 100 mas.pts.
Solution Including Styrene/Maleic Acid Copolymer
  in an amount shown in Table 5 (unit, mas.pt.)
Retardation Enhancer
  in an amount shown in Table 5 (unit, mas.pt.)
Dichloromethane 406 mas.pts.

The composition of the retardation enhancer is shown in Table 4 below. In Tables 4 below, EG is ethylene glycol, PG is propylene glycol, BG is butylene glycol, TPA is terephthalic acid, PA is phthalic acid, AA is adipic acid, SA is succinic acid.

(Solution Cast)
The composition above after mixed with the partially ring-opened, styrene/maleic anhydride was put into a mixing tank, and stirred to dissolve the constitutive ingredients, and then this was filtered through a paper filter having a mean pore size of 34 μm and through a sintered metal filter having a mean pore size of 10 μm, thereby preparing a cellulose acylate dope. The prepared dope was immediately cast onto a band caster. The film having a residual solvent amount of about 30% by mass was peeled away, and dried with hot air at 140° C., using a tenter.

Then, this was transferred from the tenter onto a roll conveyor, then dried at 120° C. to 150° C. and wound up.

Using a tenter, the width of the film was expanded to a draw ratio of 32%, and then relaxed at 140° C. for 60 seconds so that its draw ratio could be 30%, thereby giving a cellulose ester film. The film thickness was shown in Table 5 below.

Examples 2 to 23, Comparative Examples 1 to 7

Cellulose acylate dopes were prepared in the same manner as in Example 1, for which, however, the degree of substitution of the cellulose acylate resin, the type and the amount of the compound having a negative birefringence, the kind of alcohol used for partial ring-opening reaction, and the type and the amount of the retardation enhancer were changed as in Table 5 below. The compounds having a positive birefringence, which are retardation enhancers, A, E and K were produced with materials shown in the above Table 1 and Table 2 by the method described in this description. The type and the amount of the compounds having a positive birefringence are also shown in the column of retardation enhancer in Table 5 below.

Next, like in Example 1, the dope was cast in a mode of solution casting and stretched, thereby producing cellulose acylate films of Examples 2 to 23 and Comparative Examples 1 to 7.

Test Examples (Evaluation of Film Properties)
The physical properties of the cellulose acylate films of Examples 1 to 23 and Comparative Examples 1 to 7 were evaluated according to the methods mentioned below.

The properties of the films were determined according to the following methods.

(Retardation)
Using KOBRA 21ADH (by Oji Scientific Instruments) and according to the method mentioned in the above, Re and Rth were determined at a wavelength of 590 nm. The results are shown in Table 5 below.

TABLE 4

| Retardation Enhancer | Sealing rate of both ends of hydroxyl group (%) | Glycol unit | | | | Dicarboxylic acid unit | | | | | Molecular weight |
|---|---|---|---|---|---|---|---|---|---|---|---|
| | | EG (Mol %) | PG (Mol %) | BG (Mol %) | Average carbon number | TPA (Mol %) | PA (Mol %) | AA (Mol %) | SA (Mol %) | Average carbon number | |
| A | 100 | 100 | 0 | 0 | 2 | 45 | 5 | 20 | 30 | 6 | 840 |
| E | 100 | 50 | 50 | 0 | 2.5 | 55 | 0 | 0 | 45 | 6.2 | 730 |
| K | 0 | 25 | 75 | 0 | 2.75 | 45 | 5 | 0 | 50 | 6 | 790 |

(Wet Heat Durability)
After kept at 60° C. and relative humidity 90% for 150 hours, Re of the sample was measured. Based on the original Re of the sample just after its production, the difference of Re was computed and the change percentage of Re, ARe, was calculated as the difference of Re was divided by original Re.

In the same manner, after kept at 60° C. and relative humidity 90% for 150 hours, Rth of the sample was measured. Based on the original Rth of the sample just after its production, the difference of Rth was computed and the change percentage of Rth, ΔRth, was calculated as the difference of Rth was divided by original Rth.
The results are shown in Table 5 below.

(Haze of Film)
Using a haze meter (HGM-2DP, by Suga Test Instruments Co., Ltd.) and according to the method of JIS K-6714, the haze of a 40 mm×80 mm sample of the cellulose acylate film of the invention was analyzed.
The results are shown in Table 5 below.

TABLE 5

| | Cellulose acylate resin | | | Styrene/maleic anhydride copolymer | | | |
| --- | --- | --- | --- | --- | --- | --- | --- |
| | Degree of acyl substitution | Degree of acetyl substitution | Degree of propionyl substitution | St/Man Composition ratio | Alcohol | Ring open ratio (%) | Amount (mas. pt.) |
| Comp. Ex. 1 | 2.45 | 2.45 | — | — | — | — | — |
| Comp. Ex. 2 | 2.45 | 2.45 | — | 1/1 | Methanol | 0 | 5 |
| Ex. 1 | 2.45 | 2.45 | — | 1/1 | Methanol | 20 | 5 |
| Ex. 2 | 2.45 | 2.45 | — | 1/1 | Methanol | 20 | 15 |
| Ex. 3 | 2.45 | 2.45 | — | 1/1 | Methanol | 50 | 5 |
| Ex. 4 | 2.45 | 2.45 | — | 1/1 | Methanol | 80 | 5 |
| Comp. Ex. 3 | 2.45 | 2.45 | — | 1/1 | Methanol | 100 | 5 |
| Comp. Ex. 4 | 2.45 | 2.45 | — | 2/1 | Methanol | 0 | 5 |
| Ex. 5 | 2.45 | 2.45 | — | 2/1 | Methanol | 20 | 5 |
| Ex. 6 | 2.45 | 2.45 | — | 2/1 | Methanol | 50 | 5 |
| Ex. 7 | 2.45 | 2.45 | — | 2/1 | Methanol | 80 | 5 |
| Comp. Ex. 5 | 2.45 | 2.45 | — | 2/1 | Methanol | 100 | 5 |
| Comp. Ex. 6 | 2.45 | 2.45 | — | 3/1 | Methanol | 0 | 5 |
| Ex. 8 | 2.45 | 2.45 | — | 3/1 | Methanol | 20 | 5 |
| Ex. 9 | 2.45 | 2.45 | — | 3/1 | Methanol | 50 | 5 |
| Ex. 10 | 2.45 | 2.45 | — | 3/1 | Methanol | 80 | 5 |
| Comp. Ex. 7 | 2.45 | 2.45 | — | 3/1 | Methanol | 100 | 5 |
| Ex. 11 | 2.45 | 2.45 | — | 1/1 | Methanol | 80 | 5 |
| Ex. 12 | 2.45 | 2.45 | — | 2/1 | Methanol | 80 | 5 |
| Ex. 13 | 2.45 | 2.45 | — | 1/1 | Methanol | 20 | 5 |
| Ex. 14 | 2.45 | 2.45 | — | 2/1 | Methanol | 80 | 5 |
| Ex. 15 | 2.86 | 2.86 | — | 1/1 | Methanol | 20 | 5 |
| Ex. 16 | 2.86 | 2.86 | — | 2/1 | Methanol | 50 | 5 |
| Ex. 17 | 2.86 | 2.86 | — | 3/1 | Methanol | 80 | 5 |
| Ex. 18 | 2.86 | 2.86 | — | 4/1 | Methanol | 90 | 5 |
| Ex. 19 | 2.38 | 1.54 | 0.84 | 1/1 | Methanol | 20 | 5 |
| Ex. 20 | 2.38 | 1.54 | 0.84 | 2/1 | Methanol | 50 | 5 |
| Ex. 21 | 2.38 | 1.54 | 0.84 | 2/1 | Methanol | 80 | 5 |
| Ex. 22 | 2.45 | 2.45 | — | 1/1 | Propanol | 20 | 5 |
| Ex. 23 | 2.45 | 2.45 | — | 1/1 | Butanol | 20 | 5 |

| | Retardation enhancer | | Film | | | | | | |
| --- | --- | --- | --- | --- | --- | --- | --- | --- | --- |
| | Type | Amount (mas. pt.) | Draw ratio (%) | Film thickness (μm) | Re (nm) | Rth (nm) | ΔRe (%) | ΔRth (%) | Haze (%) |
| Comp. Ex. 1 | K | 15 | 30 | 45 | 46 | 112 | 11.0 | 15.0 | 0.2 |
| Comp. Ex. 2 | K | 15 | 30 | 45 | 46 | 112 | 3.2 | 4.1 | 1.8 |
| Ex. 1 | K | 15 | 30 | 43 | 45 | 115 | 3.3 | 4.4 | 0.3 |
| Ex. 2 | — | — | 30 | 43 | 32 | 89 | −1.2 | −1.1 | 0.2 |
| Ex. 3 | K | 15 | 30 | 44 | 44 | 109 | 3.2 | 3.9 | 0.4 |
| Ex. 4 | K | 15 | 30 | 47 | 43 | 117 | 3.2 | 4.2 | 0.7 |
| Comp. Ex. 3 | K | 15 | 30 | 45 | 55 | 112 | 3.5 | 4.1 | 1.4 |
| Comp. Ex. 4 | K | 15 | 30 | 46 | 53 | 117 | 3.5 | 4.7 | 2.3 |
| Ex. 5 | K | 15 | 30 | 43 | 49 | 119 | 3.4 | 4.6 | 0.8 |
| Ex. 6 | K | 15 | 30 | 46 | 46 | 113 | 2.9 | 4.3 | 0.5 |
| Ex. 7 | K | 15 | 30 | 47 | 3 | 115 | 3.1 | 4.1 | 0.3 |
| Comp. Ex. 5 | K | 15 | 30 | 47 | 53 | 115 | 3.6 | 4.6 | 1.5 |
| Comp. Ex. 6 | K | 15 | 30 | 40 | 41 | 114 | 3.3 | 5.0 | 3.9 |
| Ex. 8 | K | 15 | 30 | 47 | 45 | 109 | 3.2 | 4.7 | 3.5 |

TABLE 5-continued

| | | | | | | | | | |
|---|---|---|---|---|---|---|---|---|---|
| Ex. 9 | K | 15 | 30 | 47 | 47 | 111 | 3.2 | 4.8 | 1.1 |
| Ex. 10 | K | 15 | 30 | 43 | 46 | 112 | 3.5 | 4.6 | 0.6 |
| Comp. Ex. 7 | K | 15 | 30 | 45 | 42 | 110 | 4.1 | 4.3 | 3.1 |
| Ex. 11 | A | 15 | 30 | 53 | 47 | 118 | 2.9 | 3.9 | 0.2 |
| Ex. 12 | A | 15 | 30 | 53 | 45 | 117 | 3.1 | 4.0 | 0.3 |
| Ex. 13 | E | 15 | 30 | 51 | 46 | 119 | 2.8 | 4.2 | 0.2 |
| Ex. 14 | E | 15 | 30 | 49 | 46 | 115 | 2.7 | 4.5 | 0.2 |
| Ex. 15 | K | 15 | 30 | 45 | 49 | 118 | 3.5 | 5.2 | 0.2 |
| Ex. 16 | K | 15 | 30 | 48 | 45 | 111 | 4.5 | 5.5 | 0.3 |
| Ex. 17 | K | 15 | 30 | 49 | 45 | 116 | 3.4 | 5.3 | 0.3 |
| Ex. 18 | K | 15 | 30 | 46 | 42 | 115 | 4.1 | 5.6 | 0.5 |
| Ex. 19 | K | 15 | 30 | 48 | 46 | 120 | 5.2 | 6.3 | 0.4 |
| Ex. 20 | K | 15 | 30 | 45 | 42 | 112 | 5.6 | 6.7 | 0.3 |
| Ex. 21 | K | 15 | 30 | 43 | 47 | 115 | 5.8 | 7.2 | 0.7 |
| Ex. 22 | K | 15 | 30 | 48 | 46 | 120 | 3.1 | 4.2 | 0.2 |
| Ex. 23 | K | 15 | 30 | 45 | 42 | 112 | 3.1 | 4.7 | 0.3 |

From Table 5, it is known that the cellulose acylate films of Examples 1 to 23 of the invention have excellent wet heat durability and have a sufficiently small haze.

Concretely, from Comparative Example 1, it is known that the film with no addition of the styrene/maleic anhydride-based additive thereto had poor wet heat durability. In Examples 1 to 4 and Comparative Examples 2 and 3, the influence of the styrene/maleic anhydride-based additive having St/MAn=1/1 and having a varying degree of ring opening on the properties of the formed film was considered. From Comparative Examples 2 and 3, it is known that adding the styrene/maleic anhydride-based additive having a degree of ring opening of 0% or 100% improves the wet heat durability of the formed film, but increases the haze thereof. The same tendency is seen also in Examples 5 to 7 and Comparative Examples 4 and 5 where a styrene/maleic anhydride-based additive with St/MAn=2/1 was used, and also in Examples 8 to 10 and Comparative Examples 6 and 7 where a styrene/maleic anhydride-based additive with St/MAn=3/1 was used. From Examples 11 to 14, it is known that even when the type of the retardation enhancer to be used is changed, a cellulose acylate film having excellent wet heat durability and having a sufficiently low haze can be obtained. From Examples 15 to 21, it is known that even when the degree of acyl substitution in the cellulose acylate film to be used is changed, a cellulose acylate film having excellent wet heat durability and having a sufficiently low haze can be obtained. From Examples 22 and 23, it is known that even when the alcohol to be used for partial ring opening of the styrene/maleic anhydride moiety is changed to propanol or butanol, the same good result can be obtained.

INDUSTRIAL APPLICABILITY

The invention has made it possible to provide a cellulose acylate film of which the retardation in the in-plane direction and the thickness-direction falls within a specific range, which is excellent in the wet heat durability of the retardation in the in-plane direction and the thickness-direction thereof, and which has a sufficiently low haze. Specifically, the cellulose acylate film of the invention is favorably used as a protective film for polarizers and an optically-compensatory film for use in high-temperature high-humidity environments.

Further, the invention has made it possible to provide a liquid crystal display device having excellent wet heat durability.

The present disclosure relates to the subject matter contained in Japanese Patent Application No. 186802/2009 filed on Aug. 11, 2009, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method for producing a cellulose acylate film, comprising bringing a styrene/maleic anhydride copolymer into contact with an ingredient capable of ring-opening the ring-closed acid anhydride structure moiety in the styrene/maleic anhydride copolymer to obtain a solution of partially ring-opened, styrene/maleic anhydride copolymer, mixing the solution with a cellulose acylate resin to obtain a mixed solution comprising the cellulose acylate resin and the partially ring-opened, styrene/maleic anhydride copolymer, and casting the mixed solution to form a cellulose acylate film, wherein the partially ring-opened, styrene/maleic anhydride copolymer is represented by the following Formula (1):

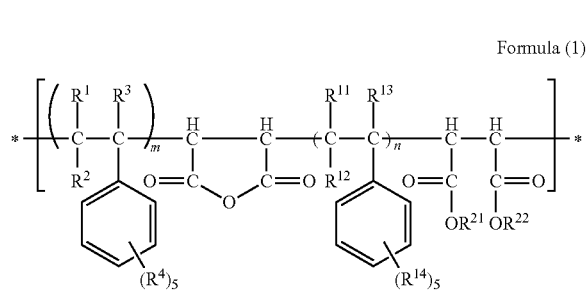

Formula (1)

wherein m and n each indicate a natural number; $R^1$ to $R^4$, $R^{11}$ to $R^{14}$, $R^{21}$ and $R^{22}$ each independently represent a hydrogen atom or a monovalent substituent and wherein at least one of $R^{21}$ and $R^{22}$ represents a substituent derived from a polymer compound having a molecular weight of from 500 to 1000.

2. The method for producing a cellulose acylate film according to claim 1, wherein the solution comprises at least one retardation enhancer.

3. The method for producing a cellulose acylate film according to claim 1, comprising dipping the styrene/maleic anhydride copolymer in an alcohol-containing solution.

4. The method for producing a cellulose acylate film according to claim 3, wherein the alcohol is methanol.

5. The method for producing a cellulose acylate film according to claim 1, wherein $R^1$ to $R^4$ and $R^{11}$ to $R^{14}$ each independently represent a hydrogen atom, a halogen atom, a substituted or unsubstituted hydrocarbon group having from 1 to 30 carbon atoms and optionally having a linking group containing an oxygen atom, a sulfur atom, a nitrogen atom or a silicon atom, or a polar group.

6. The method for producing a cellulose acylate film according to claim 1, wherein the partially ring-opened, styrene/maleic anhydride copolymer has a degree of ring opening of from 10 to 90%.

7. The method for producing a cellulose acylate film according to claim 1, wherein the partially ring-opened, styrene/maleic anhydride copolymer has a compositional ratio (St/MAn) of the styrene structure unit (St) to the partially ring-opened, maleic anhydride-derived structure unit (MAn) of from 1/1 to 4/1.

8. The method for producing a cellulose acylate film according to claim 1, wherein the partially ring-opened, styrene/maleic anhydride copolymer has a weight-average molecular weight of from 1,000 to 80,000.

9. The method for producing a cellulose acylate film according to claim 1, wherein the partially ring-opened, styrene/maleic anhydride copolymer is added in an amount of from 0.5 to 40 parts by mass relative to 100 parts by mass of the cellulose acylate resin.

* * * * *